US007765689B2

(12) United States Patent
Irish et al.

(10) Patent No.: US 7,765,689 B2
(45) Date of Patent: Aug. 3, 2010

(54) METHOD OF MANUFACTURING SELF-LOCKING WIRE TERMINAL

(75) Inventors: Kenneth G. Irish, Chicago, IL (US); James A. Turek, LaGrange, IL (US)

(73) Assignee: Illinois Tool Works Inc., Glenview, IL (US)

( * ) Notice: Subject to any disclaimer, the term of this patent is extended or adjusted under 35 U.S.C. 154(b) by 64 days.

(21) Appl. No.: 12/323,207

(22) Filed: Nov. 25, 2008

(65) Prior Publication Data

US 2009/0183367 A1 Jul. 23, 2009

Related U.S. Application Data

(62) Division of application No. 11/122,292, filed on May 4, 2005, now Pat. No. 7,491,101.

(60) Provisional application No. 60/580,478, filed on Jun. 17, 2004, provisional application No. 60/641,994, filed on Jan. 7, 2005.

(51) Int. Cl.
*H01R 9/00* (2006.01)
*B23P 23/00* (2006.01)

(52) U.S. Cl. .......................... 29/844; 29/564.1; 29/842

(58) Field of Classification Search ................ 29/564.1, 29/842, 844
See application file for complete search history.

(56) References Cited

U.S. PATENT DOCUMENTS

| | | | | |
|---|---|---|---|---|
| 3,724,068 | A * | 4/1973 | Galli | 29/833 |
| 4,667,402 | A * | 5/1987 | Wilde | 29/840 |
| 5,475,921 | A * | 12/1995 | Johnston | 29/878 |

* cited by examiner

*Primary Examiner*—C. J Arbes
(74) *Attorney, Agent, or Firm*—Mark W. Croll; Paul F. Donovan

(57) ABSTRACT

A self-locking wire terminal assembly and a shape memory wire termination system includes an electrical terminal constructed with spring legs which provide two opposing points of contact on a mating electrical conductive pin. The points of contact prevent the pin from being removed. The shape memory termination system is formed by electrically coupling a clip assembly to shape memory wire and to an electrical source. In one embodiment, the shape memory wire causes an actuator to activate when the shape memory wire dissipates electrical power. The terminal assemblies may be manufactured by assembling wire with conduction pads onto a continuous reel. The terminal assemblies may be formed from the reel by trimming wire and linkages between the conduction pads.

6 Claims, 25 Drawing Sheets

METHOD OF MANUFACTURING SELF-LOCKING WIRE TERMINAL

CROSS REFERENCE TO RELATED APPLICATIONS

This Application is a divisional application of U.S. application Ser. No. 11/122,292, filed May 4, 2005 now U.S. Pat. No. 7,491,101, which claims benefit to U.S. Provisional Application Ser. No. 60/580,478, filed Jun. 17, 2004, and to U.S. Provisional Application Ser. No. 60/641,994, filed Jan. 7, 2005.

FIELD OF THE INVENTION

The present invention relates generally to an electrical connector assembly, and more particularly to a self-locking wire terminal assembly and a shape memory wire termination assembly.

BACKGROUND OF THE INVENTION

It is known that electrical terminal assemblies are used to connect electrical devices. In order to form these electrical terminal assemblies, an electrical conductor, such as a wire, is coupled to a pair of electrical terminals or pads. The electrical pads are typically supplied either loose or on reels. The reeled pads can be supplied either on a carrier strip or chained end-to-end. In order to assemble the electrical terminal assemblies, the pads must be removed from the carrier strip and the pads must be crimped or soldered to the electrical conductor. The assembled terminal assembly is then typically connected to a connection point through the use of screws, fasteners, or the like.

A known drawback with conventional terminal assemblies is the additional assembly steps of having to remove the electrical pads from the carrier strip, and to crimp or solder the electrical pads to the conductor wire. An additional drawback is the need to connect the electrical terminal assemblies to a connection point through the use of screws and fasteners. Other drawbacks and disadvantages exist with respect to known electrical terminal assemblies and the manufacture of such assemblies that are overcome by the present invention.

SUMMARY OF THE INVENTION

The present invention is directed to self-locking wire terminal assemblies and a shape memory wire termination system. With an aspect of the invention, an electrical terminal or conduction pad is constructed with spring legs which provide two opposing points of contact on a mating electrical conducting pin. The points of contact prevent the conduction pad from being removed from the conducting pin. In another aspect of the invention, a shape memory wire terminal system is formed by electrically coupling a clip assembly to shape memory wire and to an electrical source. The shape memory wire causes an actuator to activate when the shape memory wire dissipates electrical power. Yet another aspect of the invention includes a wire and terminal assembly that is manufactured by assembling wire with electrical conduction pads onto a continuous reel. The individual wire terminal assemblies may be formed from the reel by trimming wire and linkages between adjacent electrical conduction pads.

Other features and advantages of the invention will become apparent to those skilled in the art upon review of the following detailed description, claims and drawings in which like numerals are used to designate like features.

Figure 1:
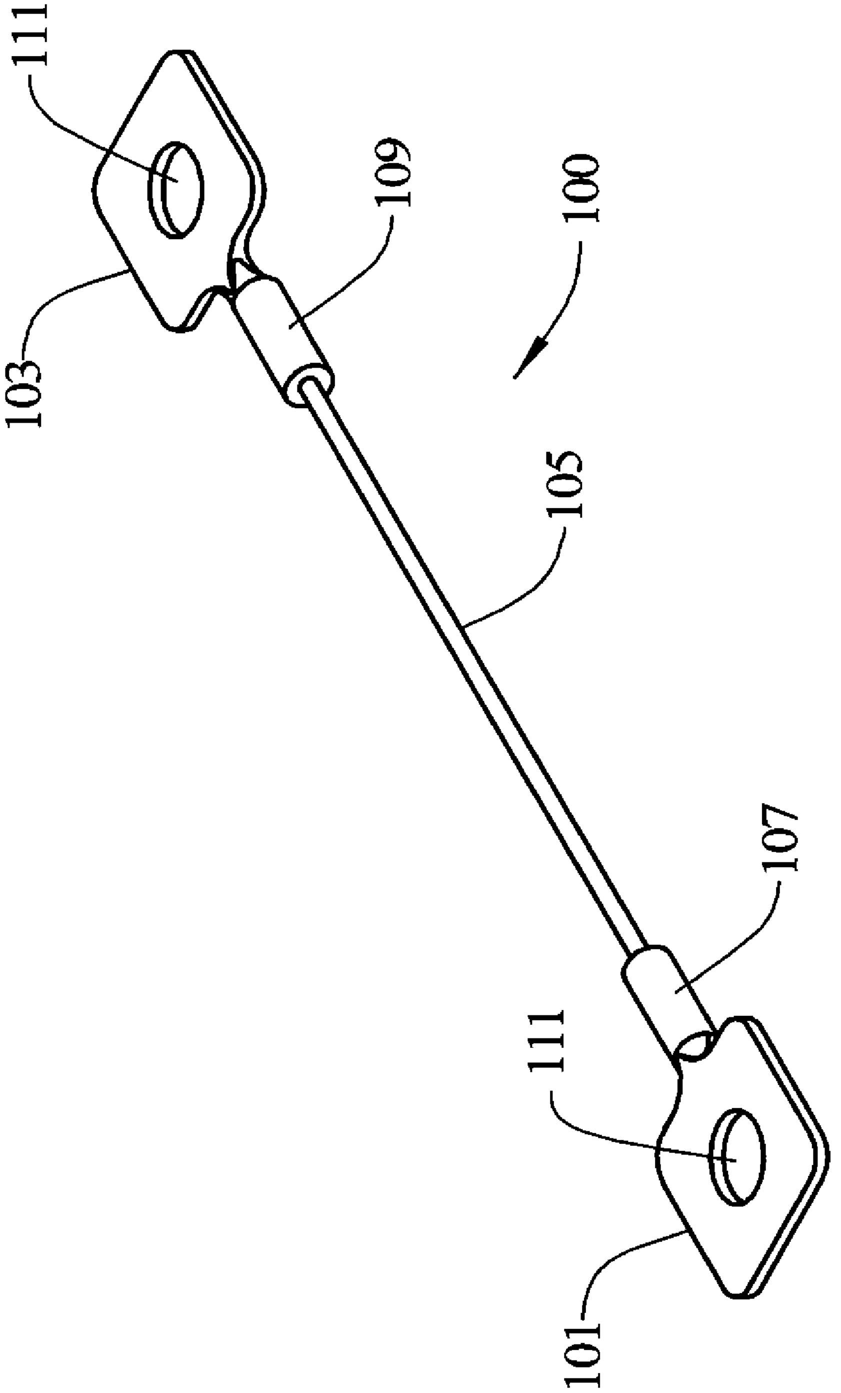
FIG. 1 (PRIOR ART)
FIG. 1 shows a known wire-terminal assembly.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

FIG. 1 shows a known wire-terminal assembly 100. The wire-terminal assembly 100 may be used to provide an electrical or mechanical connection between two components, such as components in a vehicle. The wire-terminal assembly 100 comprises electrical terminals or conduction pads 101 and 103 that are connected by conductor wire 105. The pads 101 and 103 are coupled to wire 105 by portions 107 and 109, respectively, which are crimped to the wire 105. The pads 101 and 103 each include a hole or opening 111 for attachment to a connection point through the use of a screw, threaded post, or the like, and secured through the use of a nut and a washer, not shown.

Figure 2B:
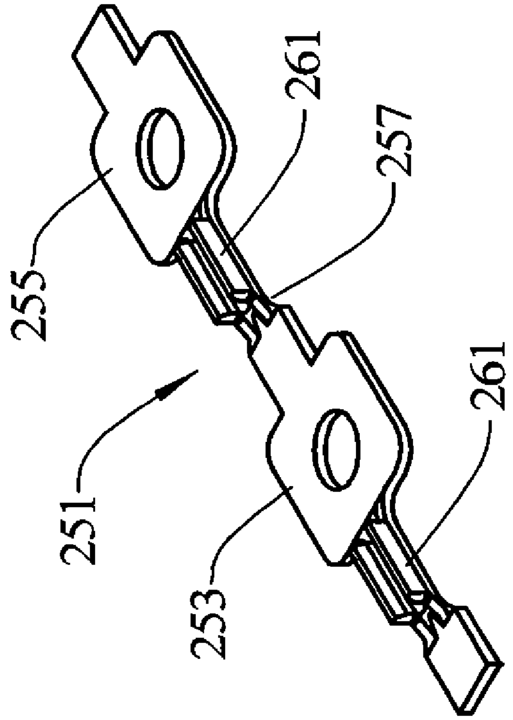
FIG. 2b (PRIOR ART)
FIG. 2*b* shows another known pair of connected conduction pads.
Figure 2A:
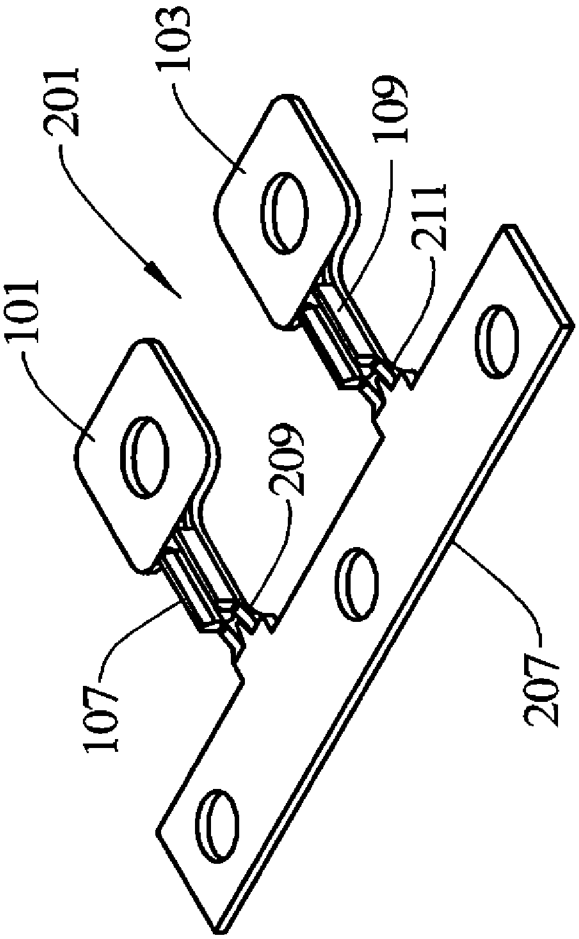
FIG. 2a (PRIOR ART)
FIG. 2*a* shows known pairs of connected conduction pads.

FIG. 2*a* shows a portion of a known supply reel 201 that includes conduction pads 101 and 103 connected by a carrier strip 207. Linkages 209 and 211 connect the conduction pads 101 and 103, respectively, to the carrier strip 207. FIG. 2*b* shows a portion of a known supply reel 251 that includes conduction pads 253 and 255 that are chained end-to-end by associated linkage 257. Each of the conduction pads 253 and 255 includes a crimping portion 261. To form the wire terminal assembly, such as the assembly depicted in FIG. 1, each conduction pad 101, 103 must be removed from the reel 201, if supplied in this manner, and then the portions 107, 109 must be crimped onto the ends of the separate conductor wire 5. As can be appreciated, to form the wire terminal assembly 100 of FIG. 1, two crimping operations are required, after the conduction pads are removed from the reel. As stated above, to mount the wire terminal assembly 100 to a connection point, screws, fasteners, and the like must be used to complete the connection. The present invention obviates these multiple assembly steps and the need for separate screws, fasteners, or the like to secure the wire terminal assembly to a connection point.

Figure 4:
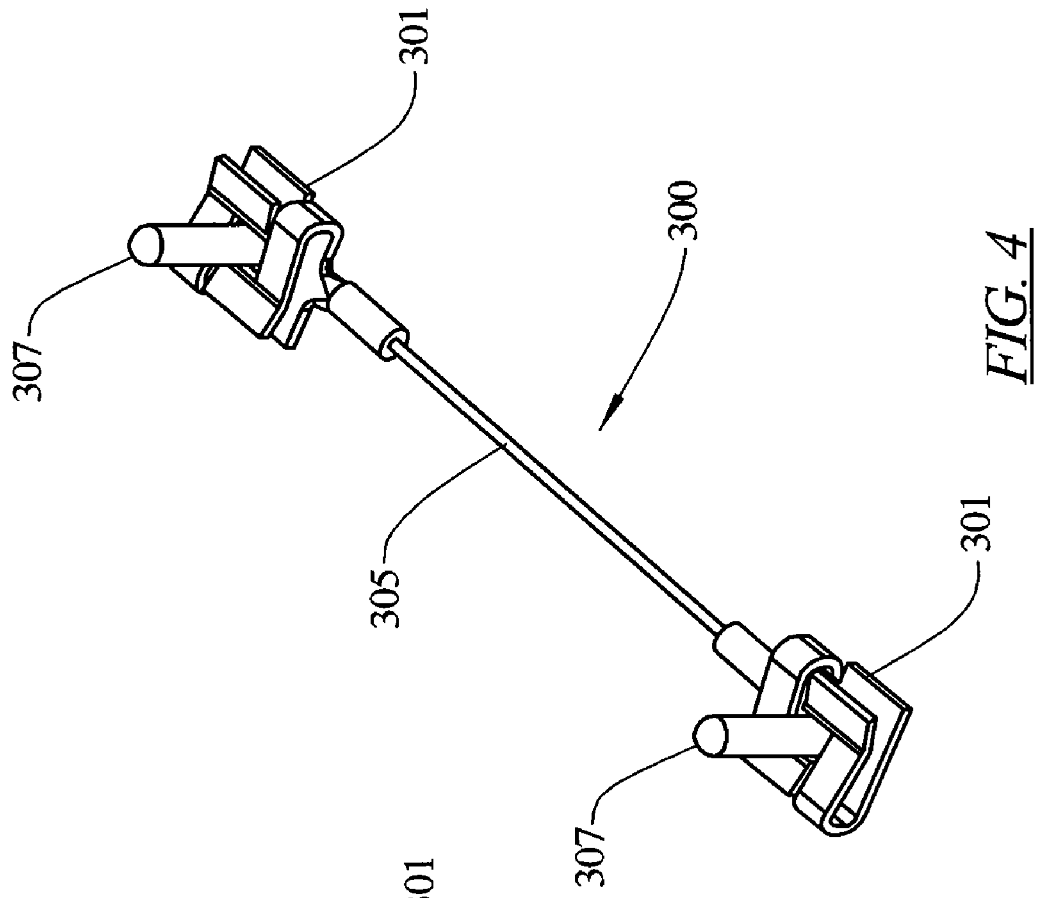
FIG. 4 shows another view the wire-terminal assembly in accordance with an embodiment of the invention.
Figure 3:
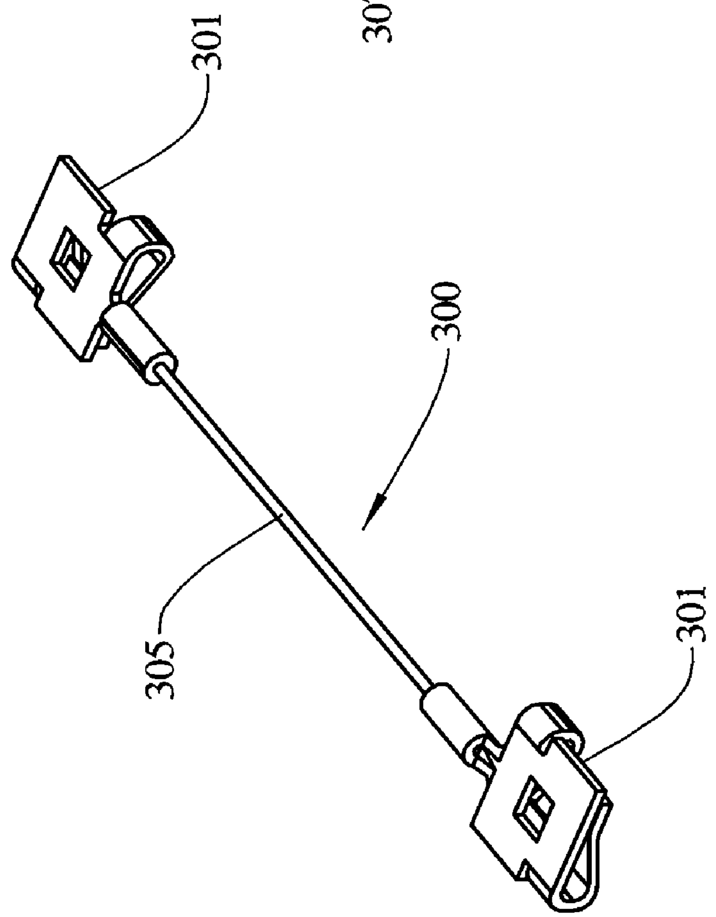
FIG. 3 shows a wire-terminal assembly in accordance with an embodiment of the invention.

Referring to FIGS. 3 and 4 there is depicted a self-locking wire terminal assembly 300 in accordance with an exemplary embodiment of the invention. The wire terminal assembly 300 is self-locking, as described in detail below, and thus eliminates the need for additional screws, fasteners, or the like to secure the wire terminal assembly to a connection point. Additionally, as described below, the wire terminal assembly is wound with a conducting wire, such as a shape memory wire, with conduction pads or terminals onto a continuous reel. With this technique, the steps of crimping the separate conduction pads onto the ends of the wire by either the manufacturer or the end user are eliminated. As set forth below, the continuous reel of wire terminal assemblies can be shipped on the reel and the end user need only cut from the reel the number of wire terminal assemblies that are needed.

As depicted in FIGS. 3 and 4, the wire terminal assembly 300 includes conduction pads or electrical terminals 301 that are electrically and mechanically connected to wire 305. While the term "conduction pads" will be used herein for ease of reference, this term is intended to also include conduction pads, electrical terminals and the like. The conduction pads 301 are self-locking in that they electrically and mechanically couple to conductive pins 307. Because of this self-locking feature, there is no longer the need for mounting screws, fasteners, or the like to secure the wire terminal assembly to a connection point.

Figure 6:
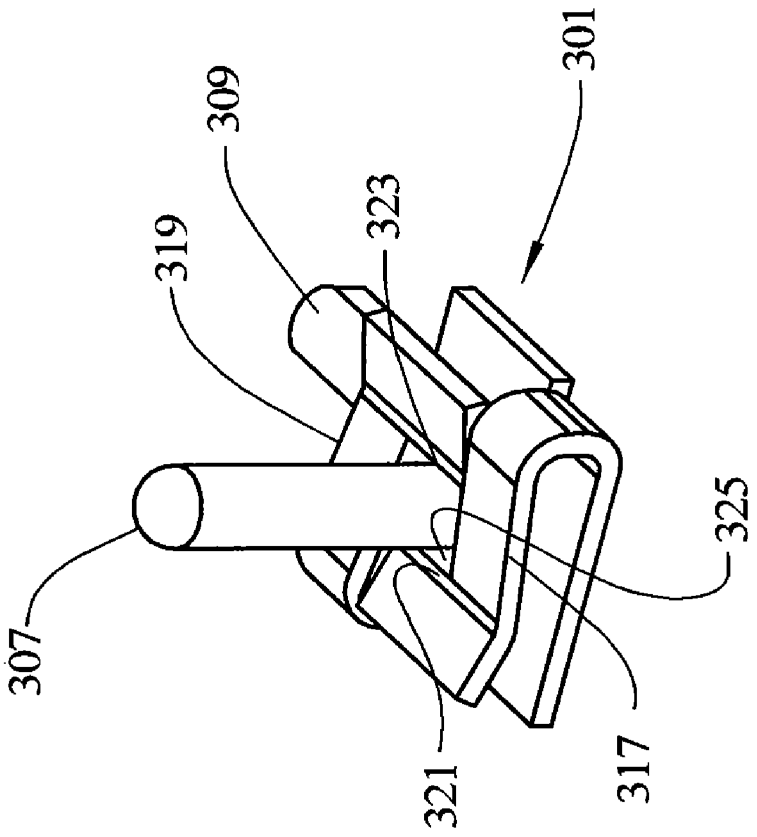
FIG. 6 shows the insertion of the conductive pin of FIG. 5 into the self-locking wire terminal in accordance with an embodiment of the invention.
Figure 5:
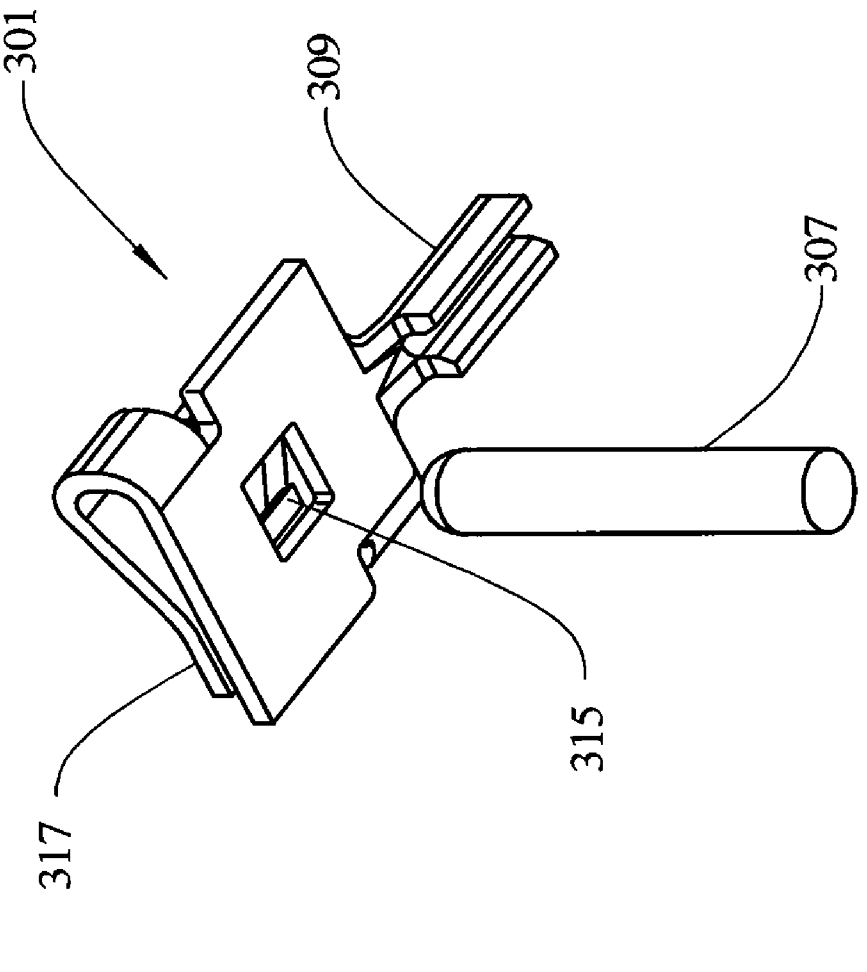
FIG. 5 shows an isometric bottom view of an exemplary self-locking wire terminal of the invention with a conductive pin being mounted to the wire terminal.
Figure 7:
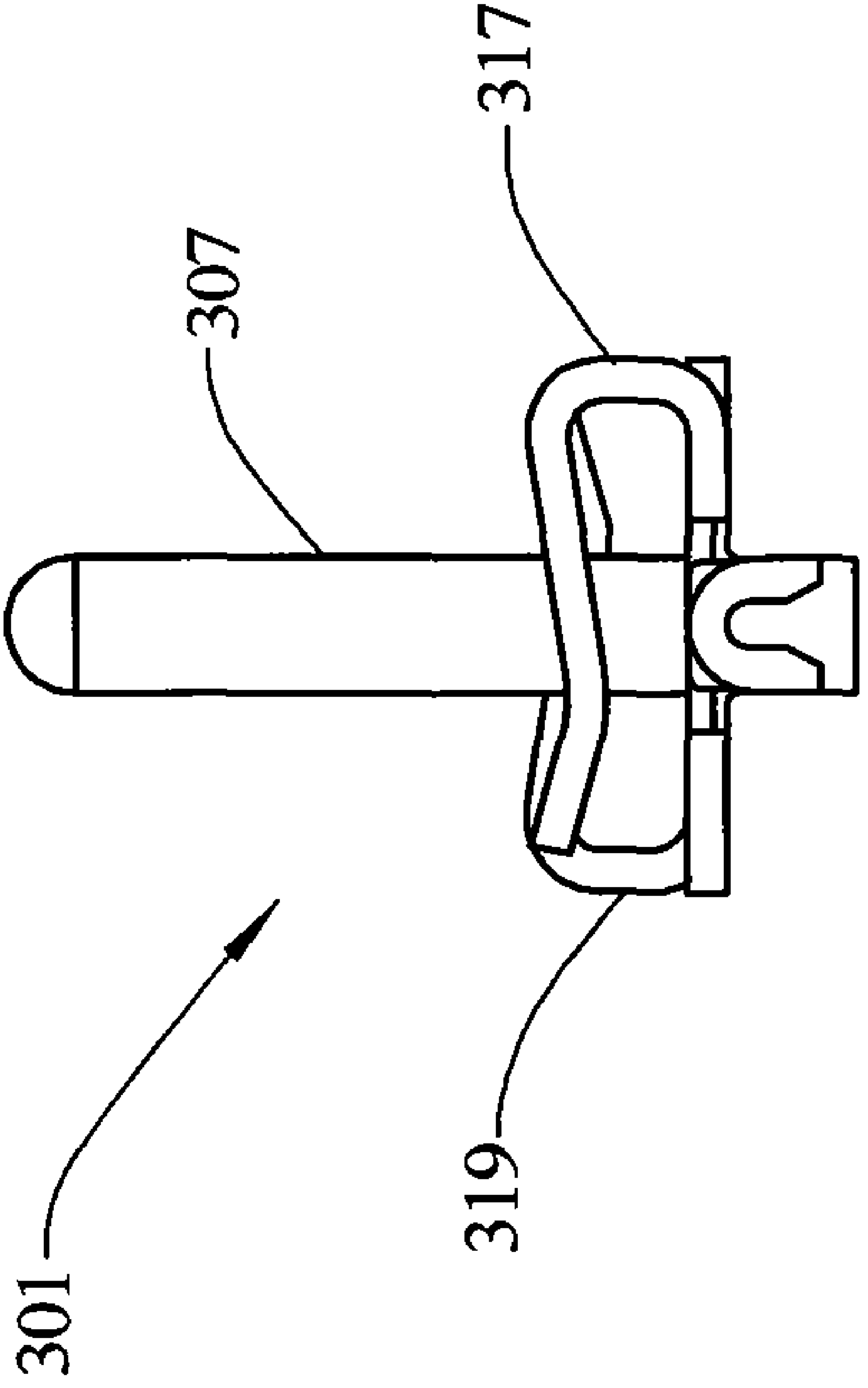
FIG. 7 shows a side view of the inserted conductive pin into the self-locking wire terminal.

Turning to FIGS. 5-7, there is shown the insertion of the conductive pin 307 into the self-locking conduction pad 301. The conduction pad 301 comprises spring legs 317 and 319 that attach to contact surfaces 321 and 323. The spring legs 317 and 319 and contact surfaces 321 and 323 are configured around a hole or opening 315 formed in the conduction pad 301. As illustrated, the conductive pin 307 is inserted into the hole 315 from the underside of the conduction pad 301. In the exemplary embodiment, the hole 315 has a square shape, although other shapes may be used depending on the application. The spring legs 317 and 319, which permit the contact surfaces 321 and 323 to bias, will cause the contact surfaces 321 and 323 to remain in biasing contact with the inserted conductive pin 307 to prevent the conductive pin 307 from withdrawing back out of the hole 315.

The contact surfaces 321 and 323 are opposing and define a space or gap 325 between the surfaces 321, 323. As depicted, the conductive pin 307 passes through the gap 325 and the opposing contact surfaces 321 and 323 provide opposing points of contact on the conductive pin 307 to secure the conductive pin in position. In an unassembled position, the gap 325 is less than the diameter of the pin 307. As the pin 307 is inserted between the contact surfaces 321 and 323 through the gap 325, the spring legs 317 and 319 are configured so they will deflect causing the gap 325 to increase as the spring legs are deflected upward. Once the pin 307 is in position, any upward force exerted on the self-locking conduction pad 301 causes the spring legs 317 and 319 to deflect downward, thereby decreasing the gap 325 and thus increasing the contact force exerted on the pin 307. The conduction pad 301 therefore becomes self-locked onto the pin 307. As should be appreciated, the conduction pads 301 described herein are merely illustrative of the teachings and principles of the invention. The conduction pads 301 may therefore take on other various shapes and configurations depending on the application and still provide the same self-locking features.

Figure 8:
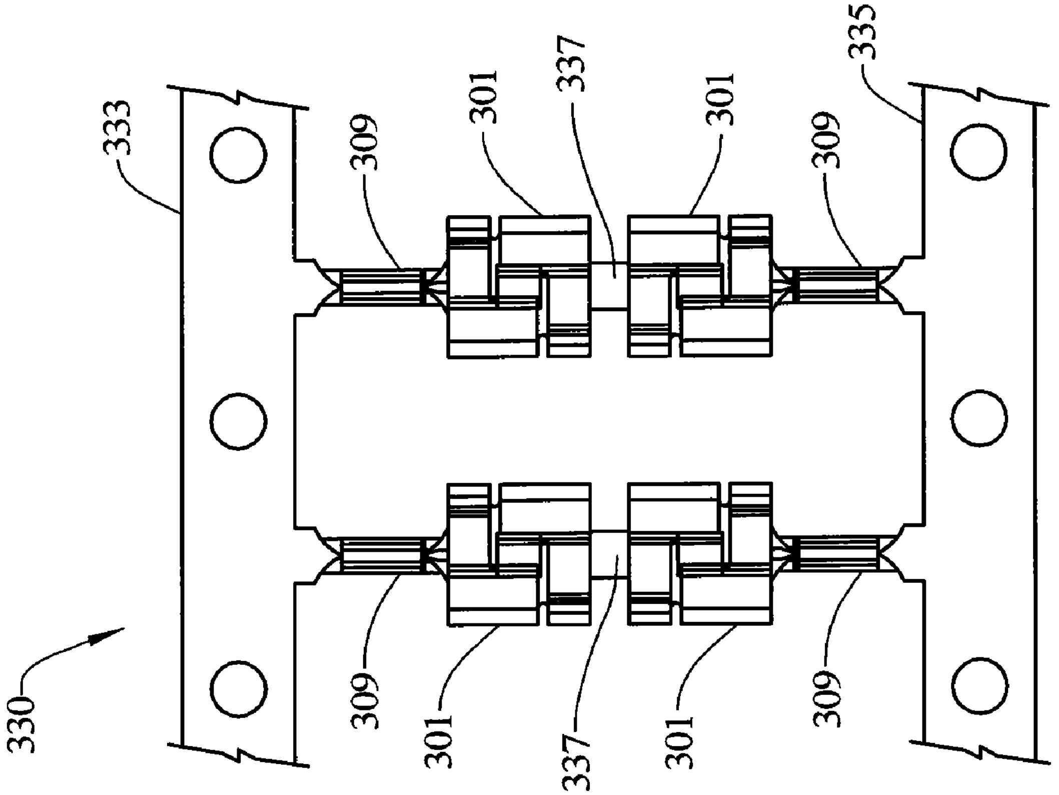
FIG. 8 shows a plan view of pairs of connected conduction pads in accordance with an embodiment of the invention.

Another aspect of the invention is depicted in FIG. 8 which shows a portion of a supply reel 330 that includes carrier strips 333 and 335. Extending between and stamped with the carrier strips 333 and 335 are pairs of connected conduction pads 301. The connected conduction pads 301 are joined together by a connecting tab or linkage 337. The conduction pads 301 are also joined to the carrier strips 333 and 335 at the ends of a crimping portion 309.

Figure 9:
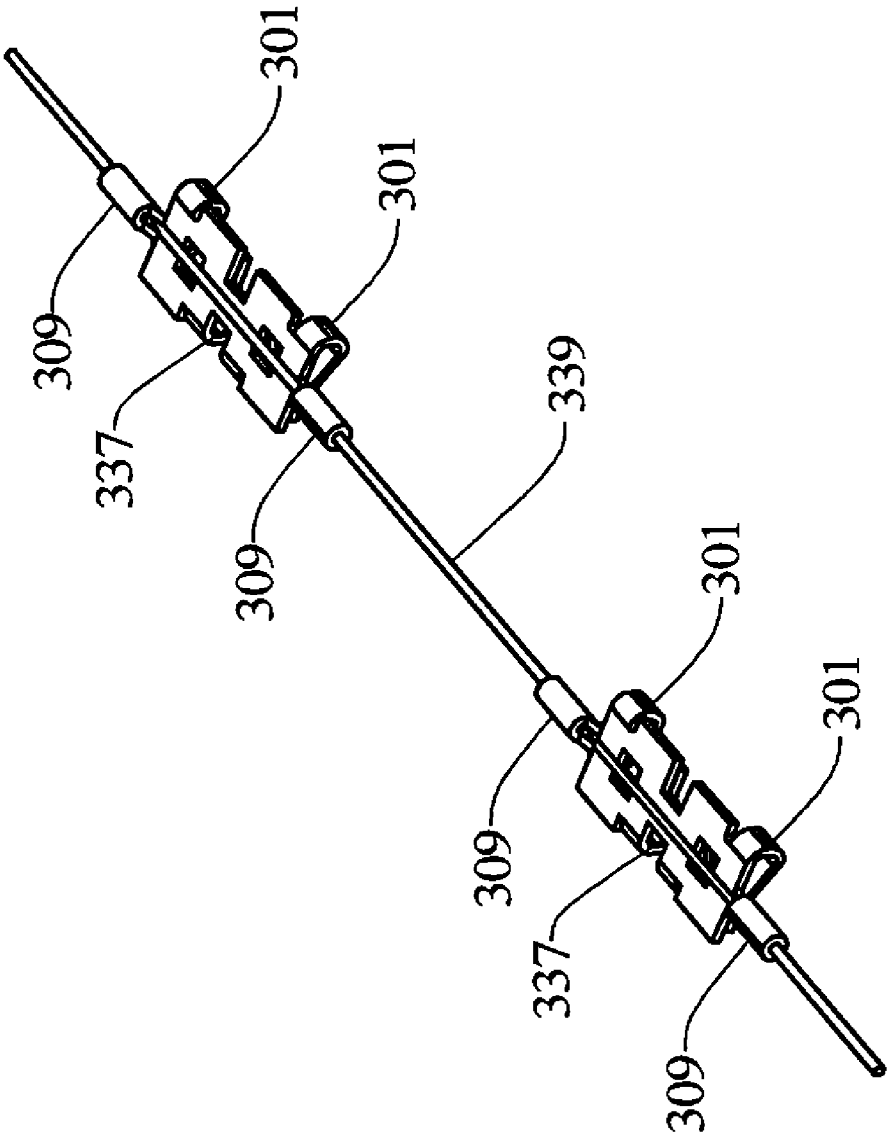
FIG. 9 shows a plurality of connected conduction pads that are assembled with a continuous wire in accordance with an embodiment of the invention.

Referring to FIGS. 8 and 9, during manufacturing, the connected conduction pads 301 are coupled to a continuous wire 339 at crimping portions 309. The carrier strips 333 and 335 are then cut away from the connected conduction pads 301 to form multiple wire terminal assemblies, as shown in FIG. 9. The multiple wire terminal assemblies may then be wound onto continuous reels for subsequent shipment and use. To form a single wire-terminal assembly, such as the wire terminal assembly 300 depicted in FIG. 3, the connecting tab or linkage 337 can be simply cut or removed as well as the portion of the continuous wire 339 located at the connecting tab 337.

Figure 10:
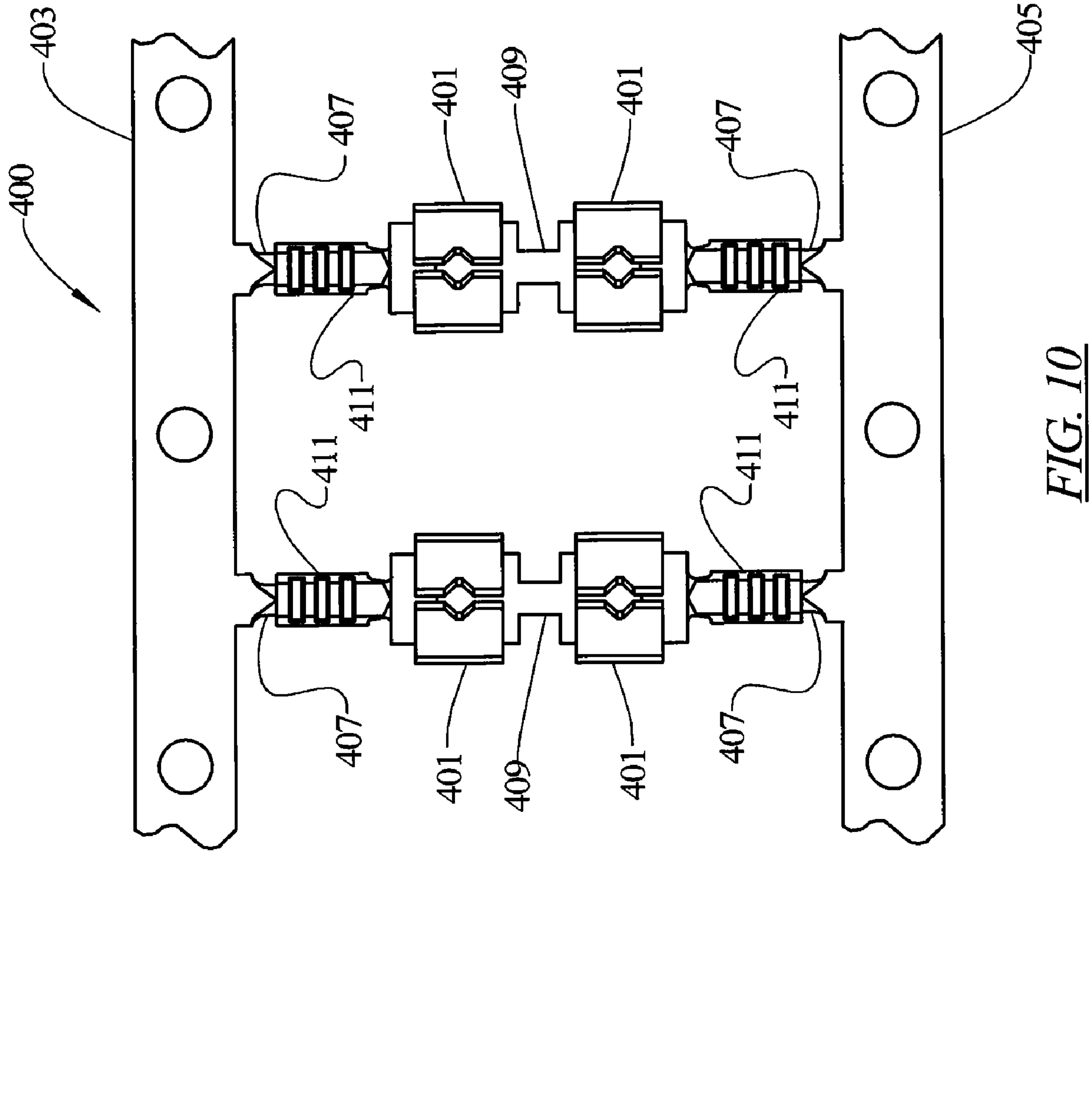
FIG. 10 shows a plan view of pairs of connected conduction pads of an alternative embodiment of the invention.
Figure 11:
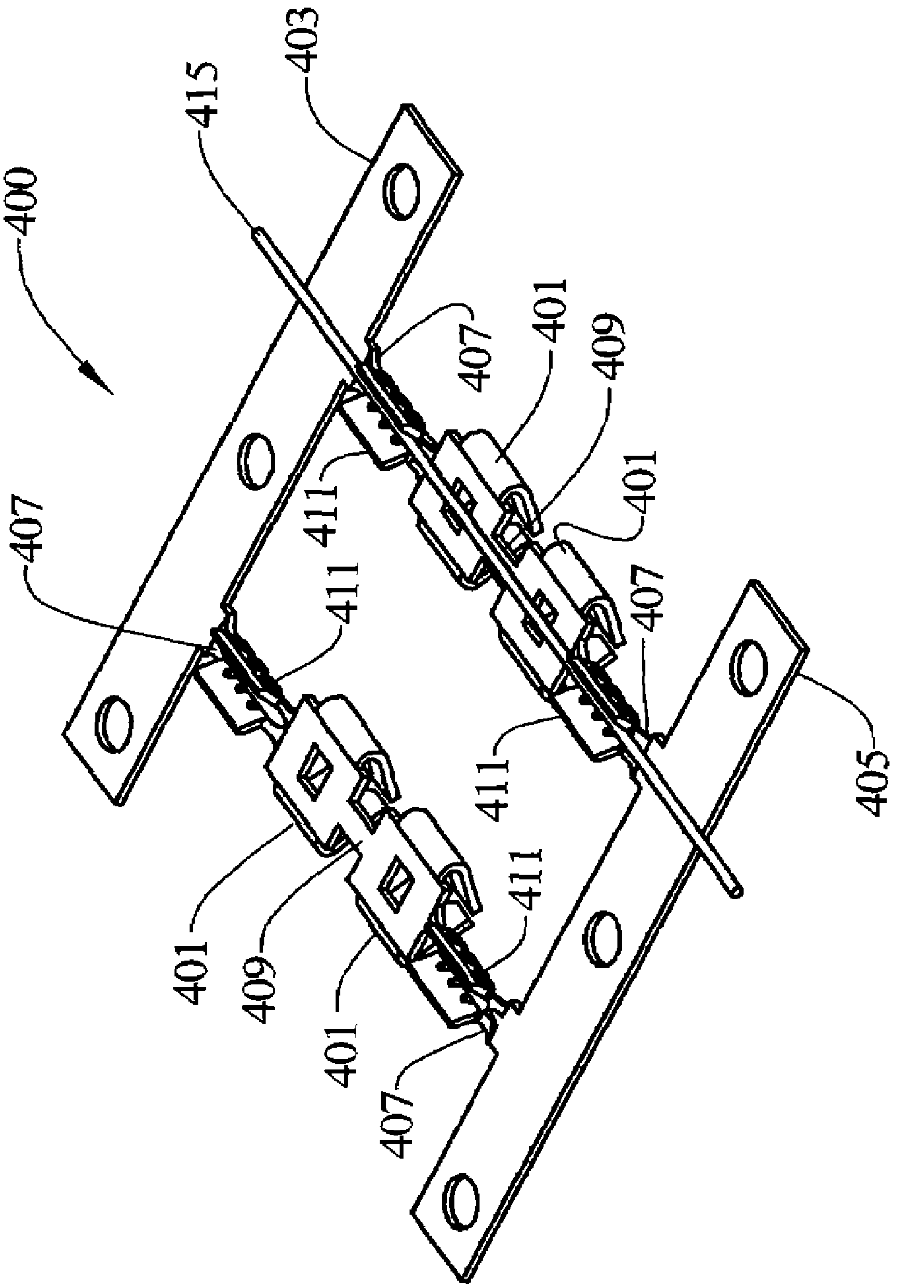
FIG. 11 shows a plurality of connected conduction pads of FIG. 10 that are assembled with a continuous wire in accordance with an embodiment of the invention.
Figure 12:
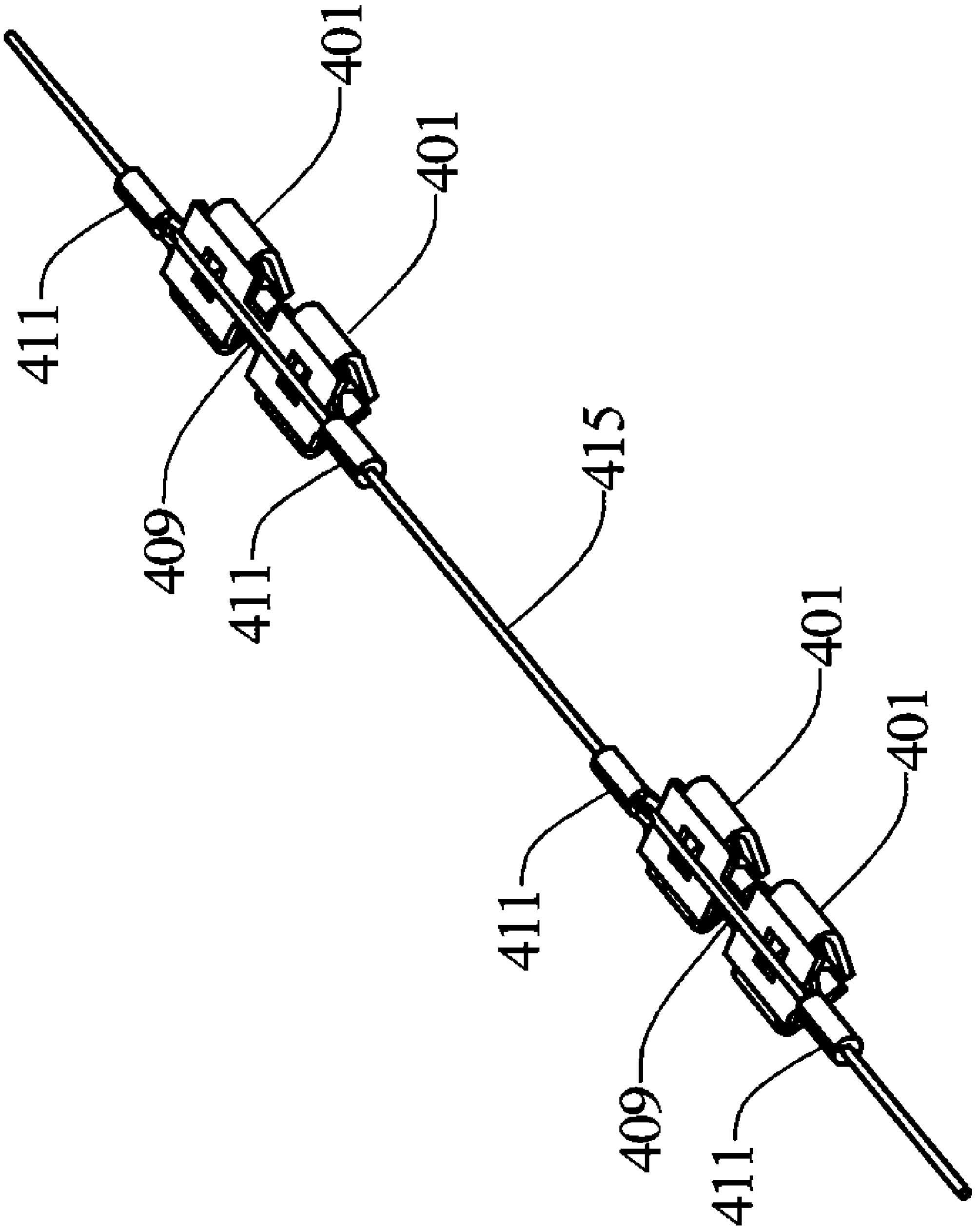
FIG. 12 shows a plurality of conduction pads of FIG. 10 connected with a continuous wire in accordance with an embodiment of the invention.

FIG. 10 shows a portion of a supply reel 400 with pairs of connected conduction pads in accordance with another embodiment of the invention. The conduction pads 401 are connected to carrier strips 403 and 405 through linkages 407 and are connected to each other through linkage 409. Each conduction pad 401 also includes crimping portion 411. Referring to FIG. 11, the connected conduction pads 401 are assembled with a continuous wire 415, in a manner similar to that described above with respect to FIGS. 8 and 9. Turning to FIG. 12, the carrier strips 403 and 405 are then removed leaving multiple conduction pads 401 formed on the wire 415. The multiple conduction pads 401 form multiple wire terminal assemblies that may then be wound onto continuous reels for subsequent shipment. In order to form a single wire-terminal assembly, such as the assembly 430 depicted in FIGS. 13*a* and 13*b*, the linkages 409 are cut or removed as well as the wire segments between the conduction pads 401.

Figure 13B:
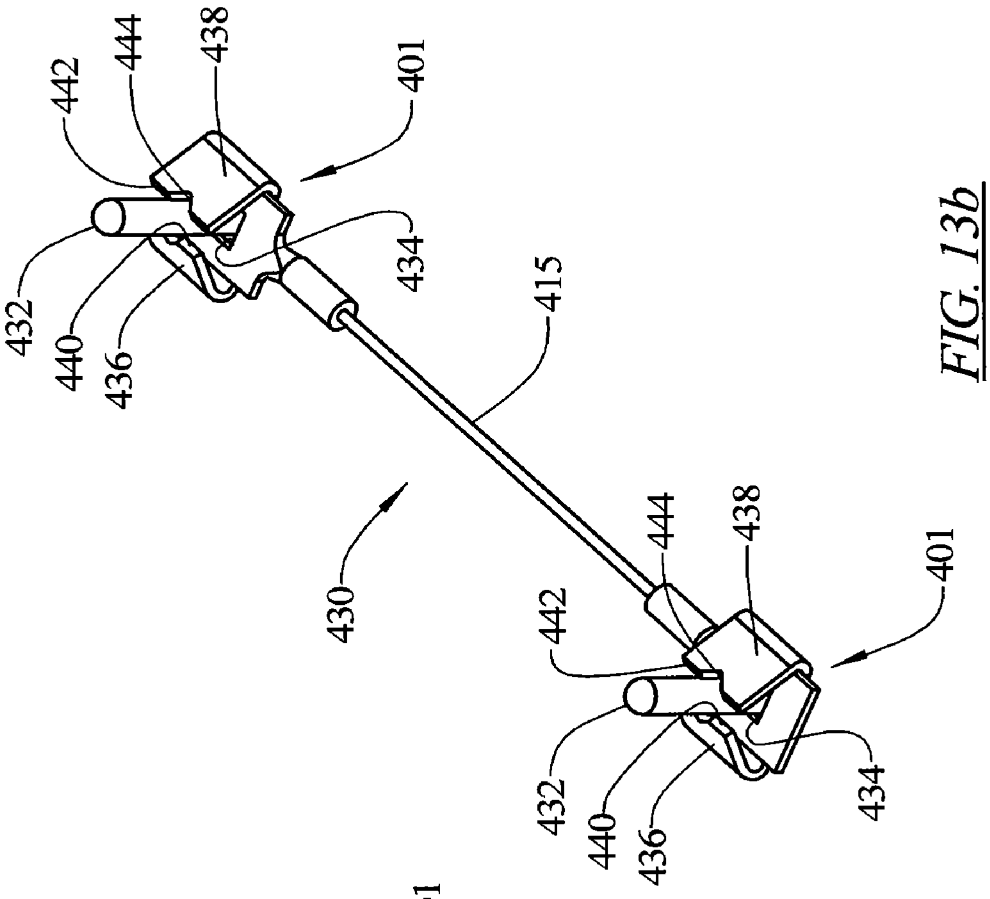
FIG. 13*b* shows another view of the wire assembly including the conduction pads of FIG. 10.
Figure 13A:
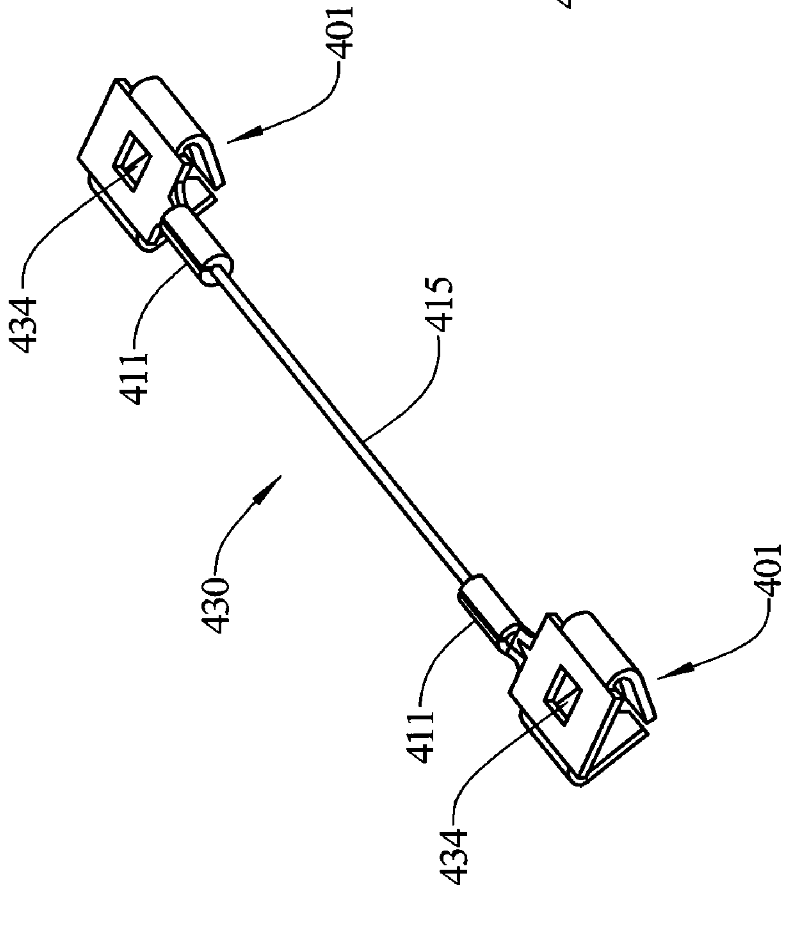
FIG. 13*a* shows a wire terminal assembly including the conduction pads of FIG. 10.

Referring to FIGS. 13*a* and 13*b*, there is shown a self-locking wire terminal assembly 430 that includes conduction pads 401 that are electrically and mechanically coupled to wire 415 at the crimping portion 411. As depicted in FIG. 13*b*, the conduction pads 401 are self-locking wire terminals that electrically and mechanically couple to conductive pins 432, in a manner similar to that described above with respect to FIGS. 3-7. That is, the conductive pins 432 are inserted into a hole 434 formed in the conduction pad 401 and between spring legs 436 and 438. The spring legs 436 and 438 define opposing contact surfaces 440 and 442. As the pin 432 passes between the spring legs 436 and 436, the pin 432 will come in contact with the contact surfaces 440 and 442. The biasing nature of the spring legs 436 and 438 causes the contact surfaces 440 and 442 to contact opposing sides of the pin 432 and prevent the conduction pad 401 from being removed from the pin 432. In the depicted embodiment, the contact surfaces 440 and 442 are integrally formed with the spring legs 436 and 438. In an exemplary embodiment, the contact surfaces 440 and 442 further define V-shaped notches 444 that aid in holding the pin 432 in position.

FIGS. 14-22 depict a shape memory wire terminal system of the invention. This system provides both mechanical and electrical connections to shape memory wire, such as memory alloy wire. Shape memory wire contracts when heated and expands when cooled and is used to actuate lightweight mechanisms. Heating of the wire is accomplished by passing electrical current through the wire.

Figure 14:
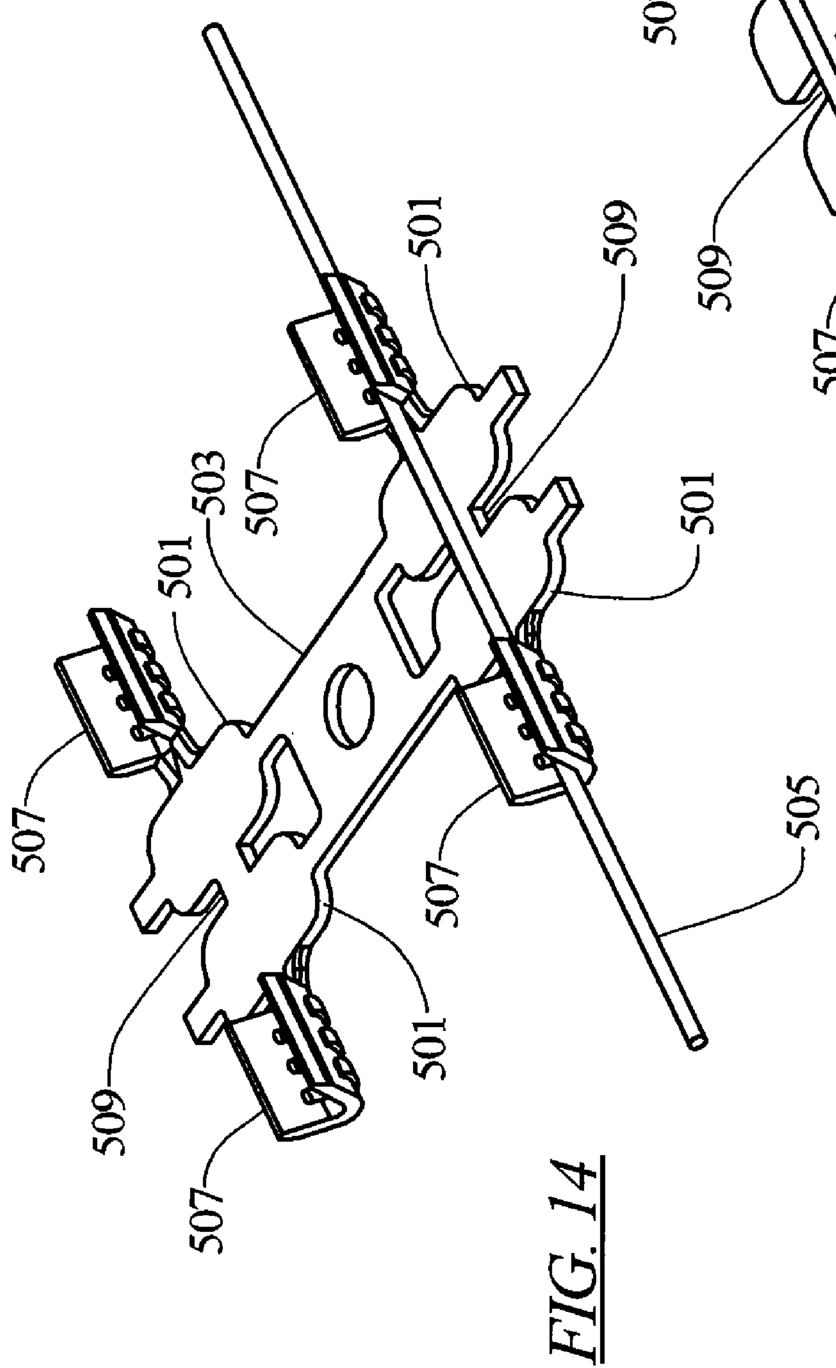
FIG. 14 shows a plurality of conduction pads and shape memory wire of an alternative embodiment of the invention.
Figure 15:
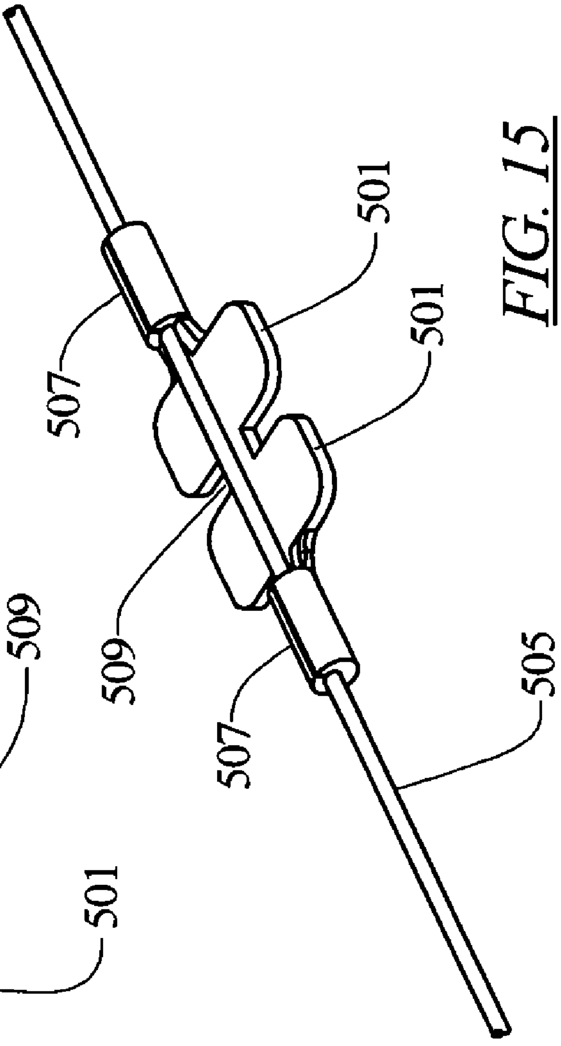
FIG. 15 shows a continuous length of connected shape memory wire terminal assemblies.

As depicted in FIG. 14, a plurality of conduction pads 501 are stamped in pairs with a center carrier strip 503. During manufacturing, memory wire 505 is fed through crimp portions 507 and crimped to create a continuous length of connected memory wire terminal assemblies. The conduction pads 501 are connected by linkages 509 and by the center carrier strip 503. As illustrated by FIG. 15, the center carrier strip 503 may be removed and the continuous length of connected memory wire terminal assemblies may be wound onto reels for subsequent shipment and use.

Figures 16, 17:
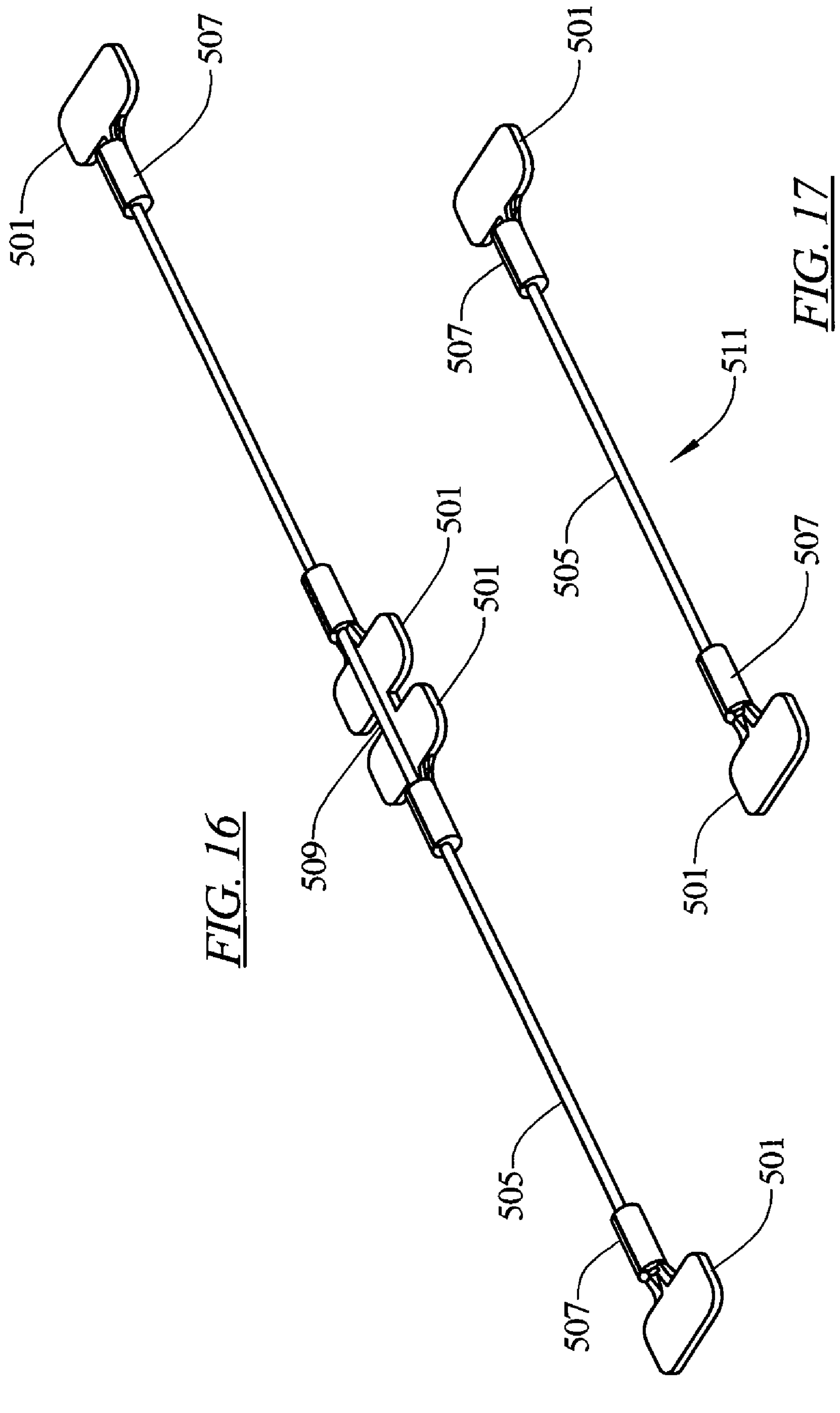
FIG. 16 shows another view of a continuous length of connected shape memory wire terminal assemblies.
FIG. 17 shows a single shape memory wire terminal assembly of the invention.

FIG. 16 further illustrates the continuous length of connected memory wire terminal assemblies. To form a single memory wire terminal assembly, such as the memory wire terminal assembly 511 shown in FIG. 17, the linkage 509 shown in FIG. 16 is cut or removed as well as the memory wire 505 segment at that location. As depicted by FIG. 17, the single memory wire terminal assembly 511 includes a pair of conduction pads 501 that are coupled to memory wire 505 at the crimping portions 507.

Figure 18:
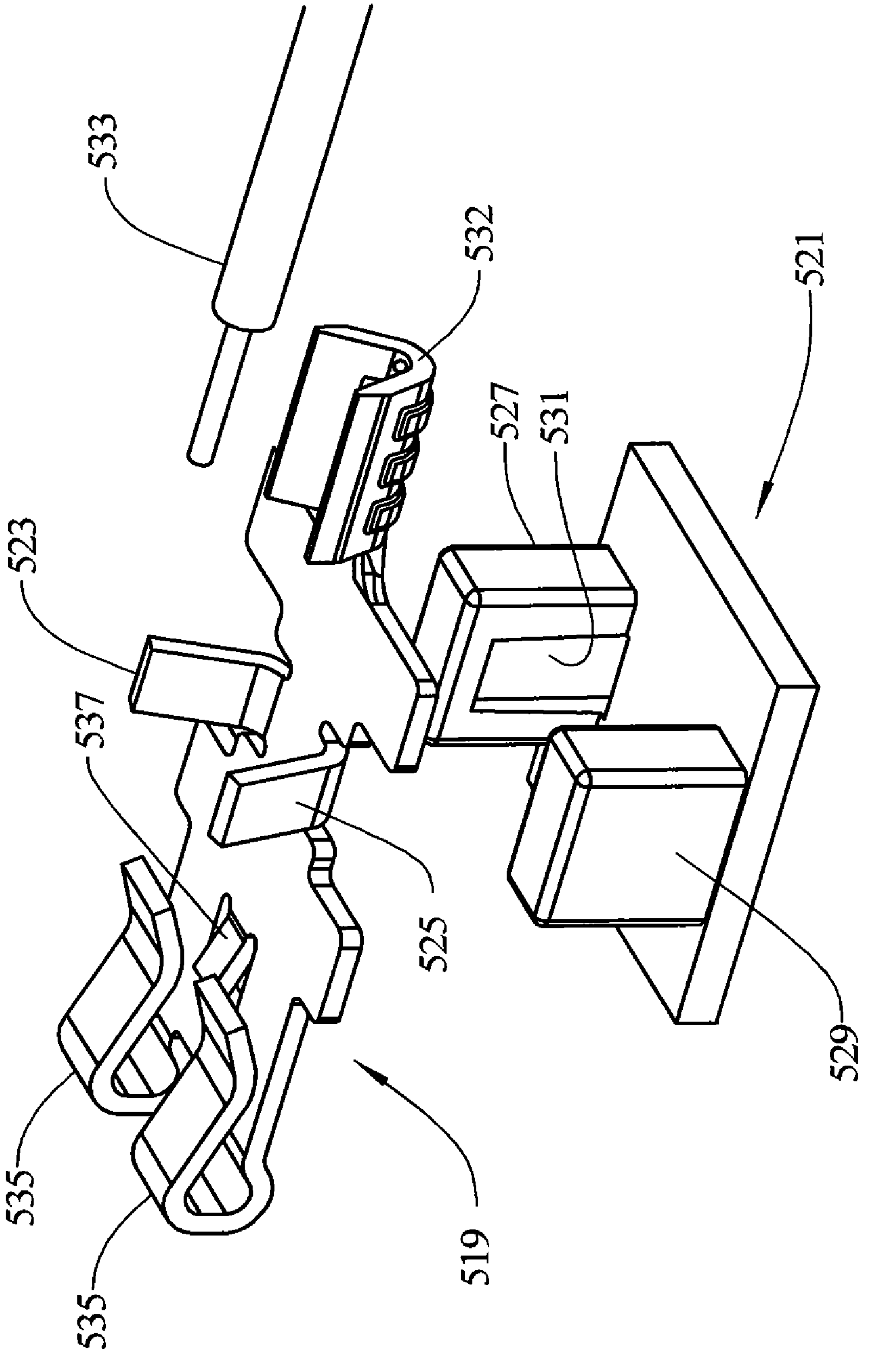
FIG. 18 shows a contact clip being coupled to a housing according to an embodiment of the invention.
Figure 20:
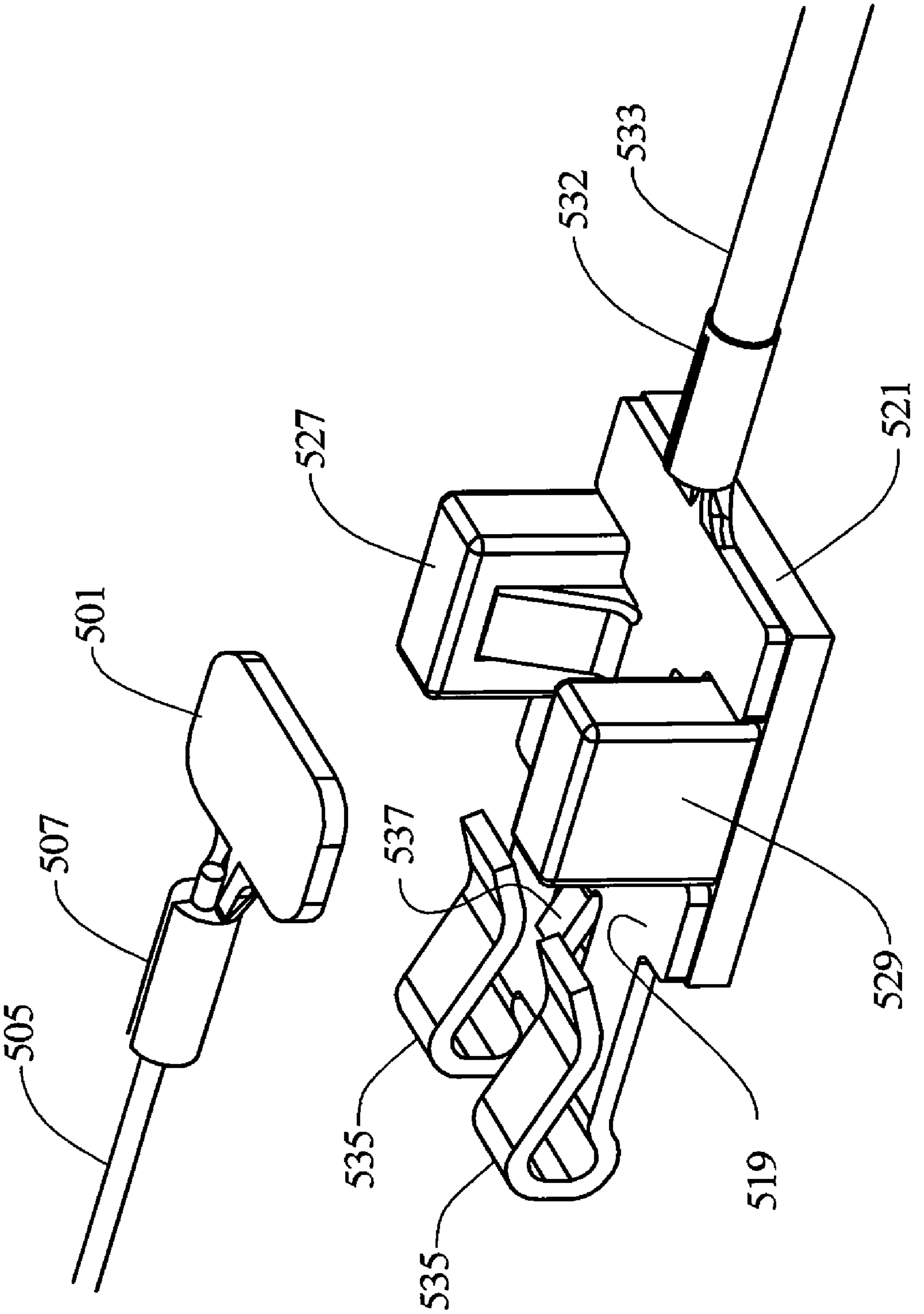
FIG. 20 shows an exemplary shape memory wire assembly being coupled to a clip assembly of FIG. 19 to form a terminal assembly according to an embodiment of the invention.
Figure 21:
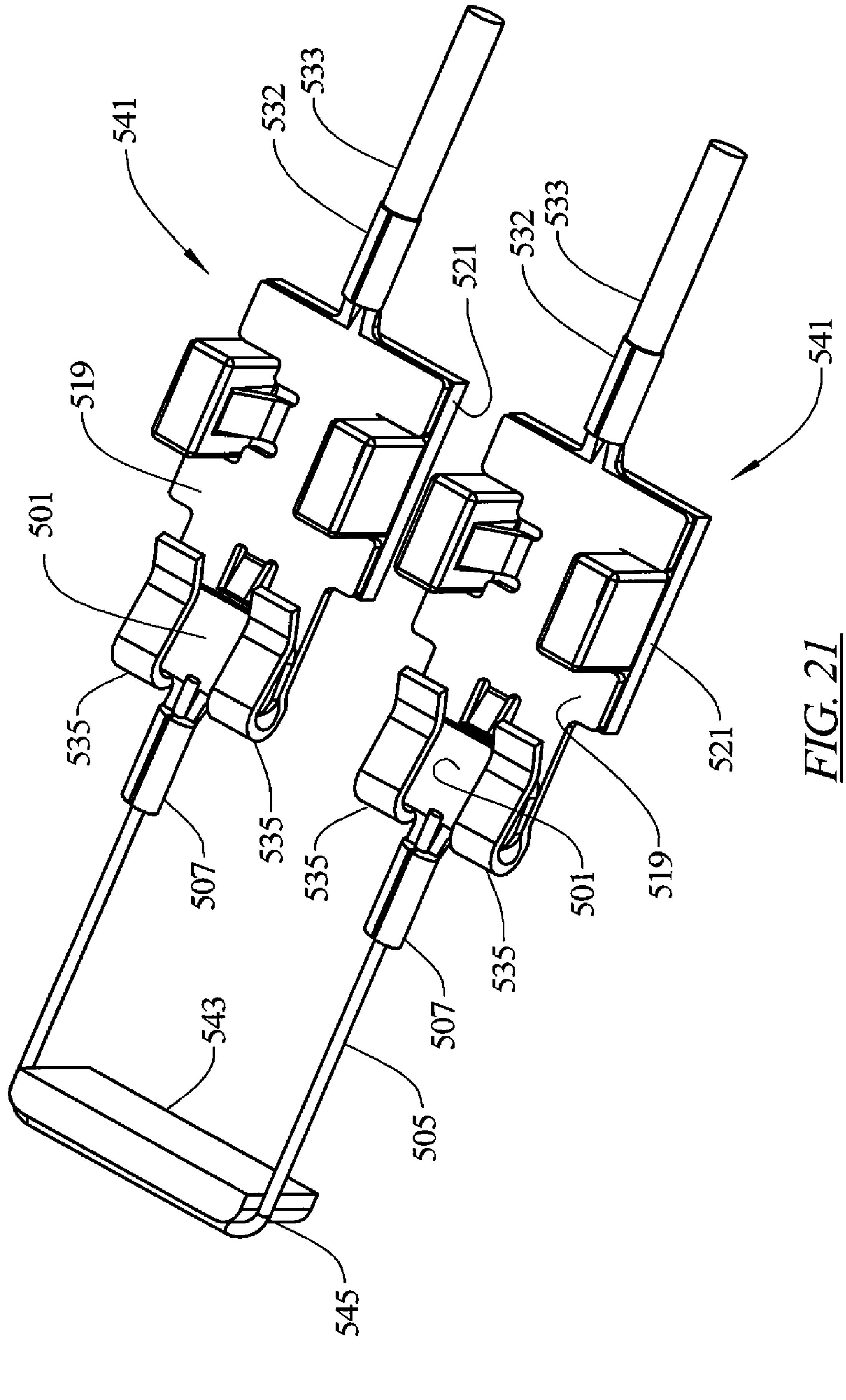
FIG. 21 shows a wire terminal system according to an embodiment of the invention.

The conduction pads 501 are configured to mate with a contact clip 519, shown in FIG. 18, or other connection point. The contact clip 519 provides both a mechanical and electrical connection. An exemplary contact clip 519 is depicted in FIG. 18 and is shown being mounted to an equipment housing 521 according to an embodiment of the invention. The contact clip 519 includes retaining tabs 523 and 525 which are retained by clip retention posts 527 and 529 of the housing 521. More specifically, the retaining tab 523 will seat within a recess portion 531 formed in the retention post 527. The retaining tab 525 will seat within a similar recess portion formed in the retention post 529. The contact clip 519 further includes a crimping portion 532 that crimps onto conductor wire 533, which supplies electrical power for heating the shape memory wire 505, as described below. The contact clip 519 also comprises flexible contact fingers 535 that electrically and mechanically couple to the conduction pad 501, as illustrated by FIGS. 20 and 21. To further hold the conduction pad 501 onto the contact clip 519, a retaining tab 537 may be used to permit the conduction pad 501 to snap-fit onto the contact clip 519 between the retaining tab 537 and the contact fingers 535. The retaining tab 537 may be a rigid tab or a flexible tab. As can be readily appreciated, the contact clip 519 may take on various configurations depending on the particular application.

Figure 19:
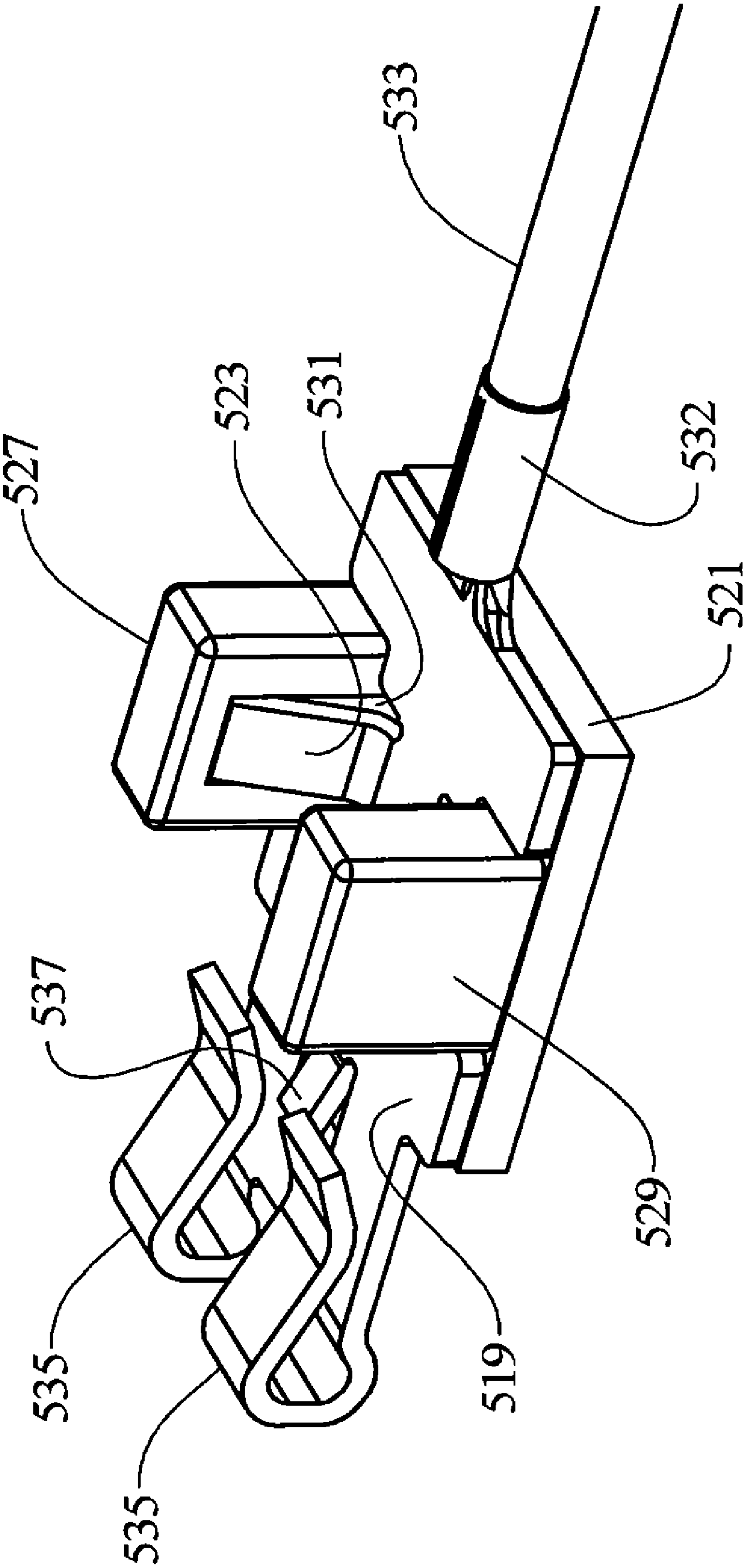
FIG. 19 shows a contact clip that is coupled to a housing according to an embodiment of the invention.

FIG. 19 shows the contact clip 519 mounted to the housing 521. This assembly forms a terminal assembly according to an embodiment of the invention. As can be seen from FIG. 19, the retaining tab 523 is shown seated within the recess portion 531 of the post 527. Also depicted is the conductor wire 533 crimped to the crimping portion 532 to complete the assembly and to electrically couple the conductor wire 533 to the contact clip 519 and contact fingers 535.

FIG. 20 shows the conduction pad 501 and memory wire 505 being coupled to the contact clip 519. The conduction pad 501 will be positioned below the flexible contact fingers 535 and behind the retaining tab 537. Once in position, the conduction pad 501 will be electrically coupled to the contact clip 519 through the flexible contact fingers 535. As indicated above, the contact fingers 535 are electrically coupled to the conductor wire 533. Thus, electrical current supplied by the conductor wire 533 flows through the contact clip 519 and the contact fingers 535, and then to the conduction pad 501 and memory wire 505, thereby heating the memory wire 505. One skilled in the art will appreciate that the invention is not limited to the particular shape and configurations of the exemplary contact clips, contact fingers, and housing depicted in the Figures, that other shapes and configurations of these components are possible depending on the particular application.

Referring to FIG. 21 there is shown a pair of wire terminal assemblies 541 with shape memory wire 505 that are coupled to an actuator 543. The wire terminal assemblies 541 include the conductor wire 533 that is electrically coupled to the contact clip 519, which is mounted to the housing 521. The contact clip 519 includes the contact fingers 535 that electrically couple the contact clip 519 to the conduction pad 501. The conduction pad 501 is electrically coupled to the shape memory wire 505 by being crimped to the wire 505 at the crimping portion 507. The actuator 543 is attached to the shape memory wire 505 by fitting the wire 505 into a grooved region 545 on the actuator 543. In use, electrical power is provided to the shaped memory wire 505 as described above. As the electrical power is received by the shape memory wire 505, the shape memory wire 505 shrinks or contracts to move the actuator 543. In the embodiment depicted in FIG. 21, as the shape memory wire 505 contracts, the actuator 543 moves toward the wire terminal assemblies 541. One skilled in the art will appreciate that this embodiment will support various applications and uses, for example, the movement of the actuator 543 may actuate a switch or other electrical device, may open a mechanical structure, or may be used with numerous other applications.

Figure 22A:
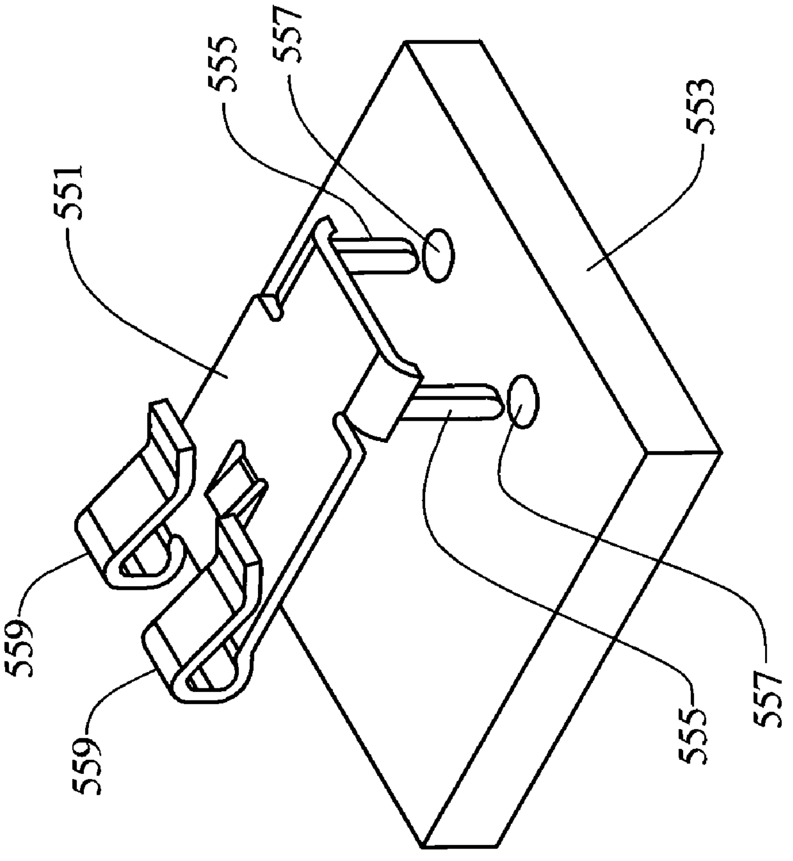
FIG. 22*a* shows an alternative clip being coupled to a printed circuit board according to an embodiment of the invention.
Figure 22B:
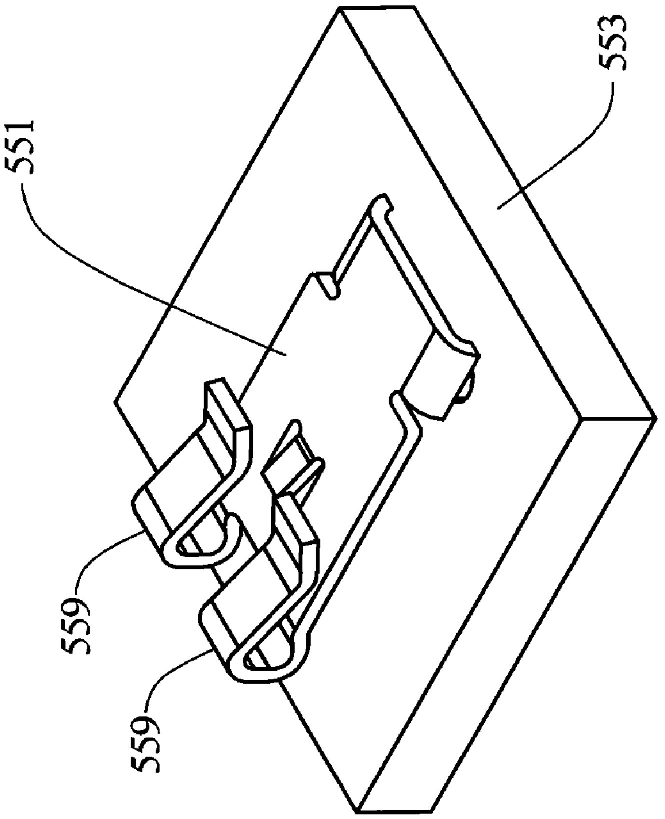
FIG. 22*b* shows the clip of FIG. 22*a* coupled to a printed circuit board according to an embodiment of the invention.

FIGS. 22*a* and 22*b* show an alternative embodiment of a contact clip. The contact clip 551 may be mounted to a printed circuit board 553. The contact clip 551 is similar to the clip 519 but also includes mounting legs 555 that may be soldered, or otherwise secured, to openings 557 formed in the printed circuit board 553. FIG. 22*b* illustrates the contact clip 551 coupled to the printed circuit board 553. As with the above embodiment, the contact clip 551 includes contact fingers 559 that are configured to receive the conduction pad 501 and accompanying shape memory wire 505, not shown but described above. Electrical power provided through the printed circuit board 553 is transferred to the contact clip 551 via the legs 555, through the contact fingers 559, and then to the conduction pad 501.

Figure 23:
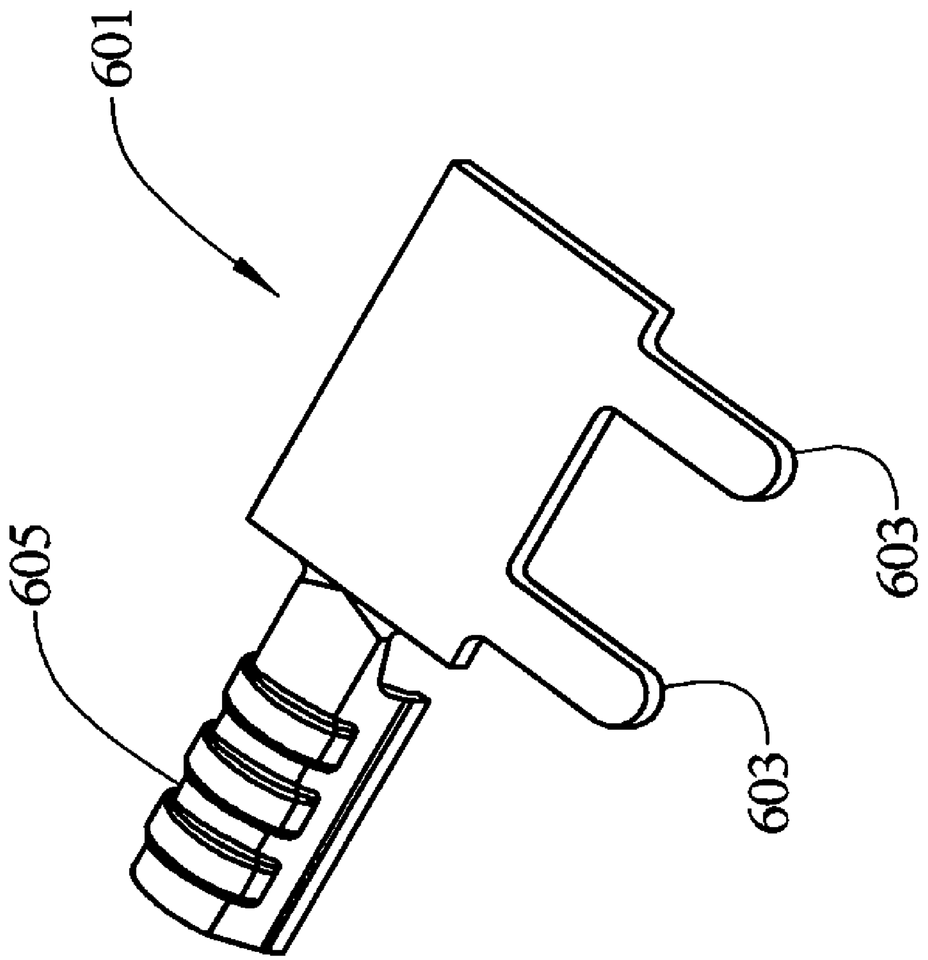
FIG. 23 shows a conduction clip that may be coupled to a printed circuit board according to an embodiment of the invention.

In another aspect of the invention, FIG. 23 shows an embodiment of a conduction clip 601 that may be coupled to a printed circuit board, such as the printed circuit board illustrated in FIG. 22*a*. The conduction clip 601 may be inserted into a printed circuit board by inserting prongs or legs 603 into mating holes in the printed circuit board. The conduction clip 601 also includes a crimping portion 605 that may be crimped to a shape memory wire to electrically couple the conduction clip 601 to the shape memory wire.

Figure 24:
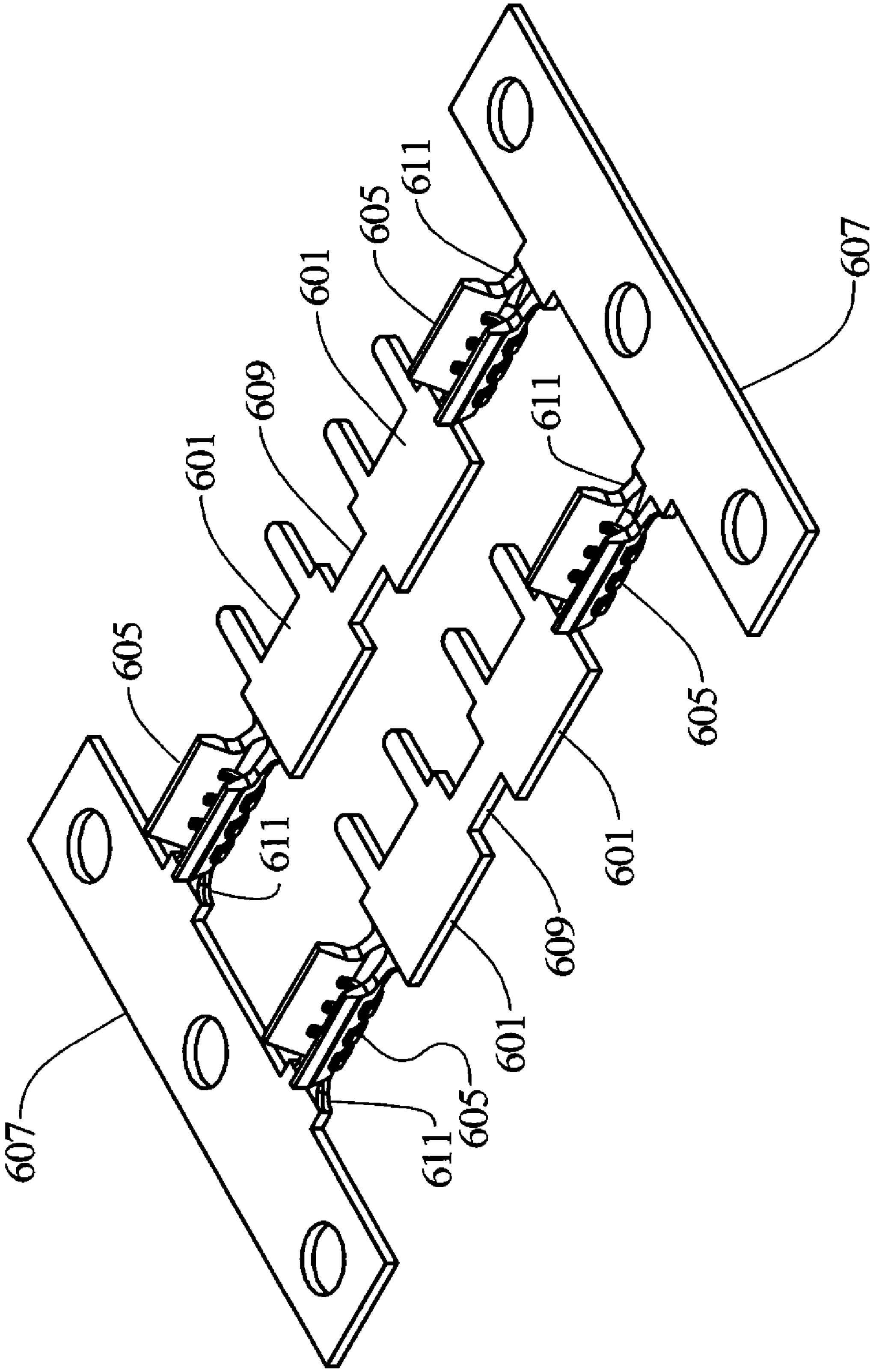
FIG. 24 shows pairs of connected conduction clips of FIG. 23 according to an embodiment of the invention.

Referring to FIG. 24, to manufacture the conduction clips 601, the clips can be stamped with carrier strips 607 that are part of a supply reel. The conduction clips 601 are connected by linkage 609 and are joined to the carrier strips 607 through linkages 611. As described above, a continuous wire, such as a shape memory wire, may be joined to each conduction clip 601 at the crimping portion 605 to form multiple wire terminal assemblies. The carrier strips 607 can then be cut away from the connected conduction clips 601 at the linkage 611 and the multiple wire terminal assemblies may then be wound onto reels for subsequent shipment and use. To form a single wire-terminal assembly, the linkage 609 can be simply cut or removed as well as the portion of the continuous wire located at the linkage 609.

Figure 26:
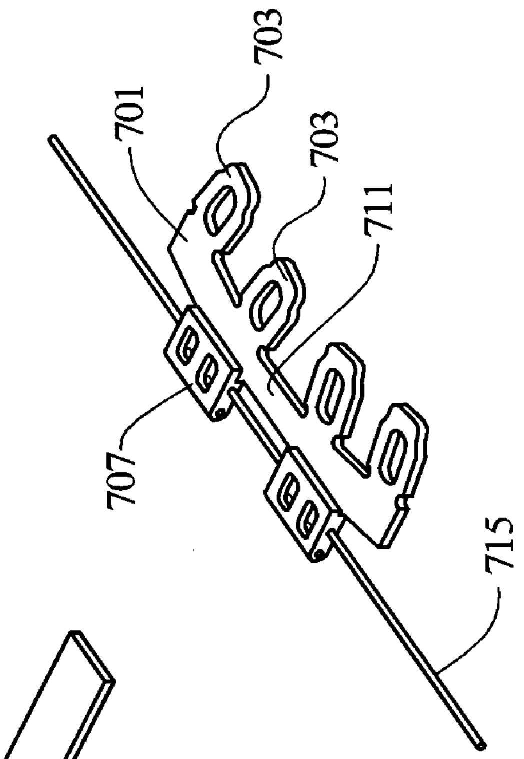
FIG. 26 shows the connected conduction clips of FIG. 25 coupled to a continuous wire.
Figure 25:
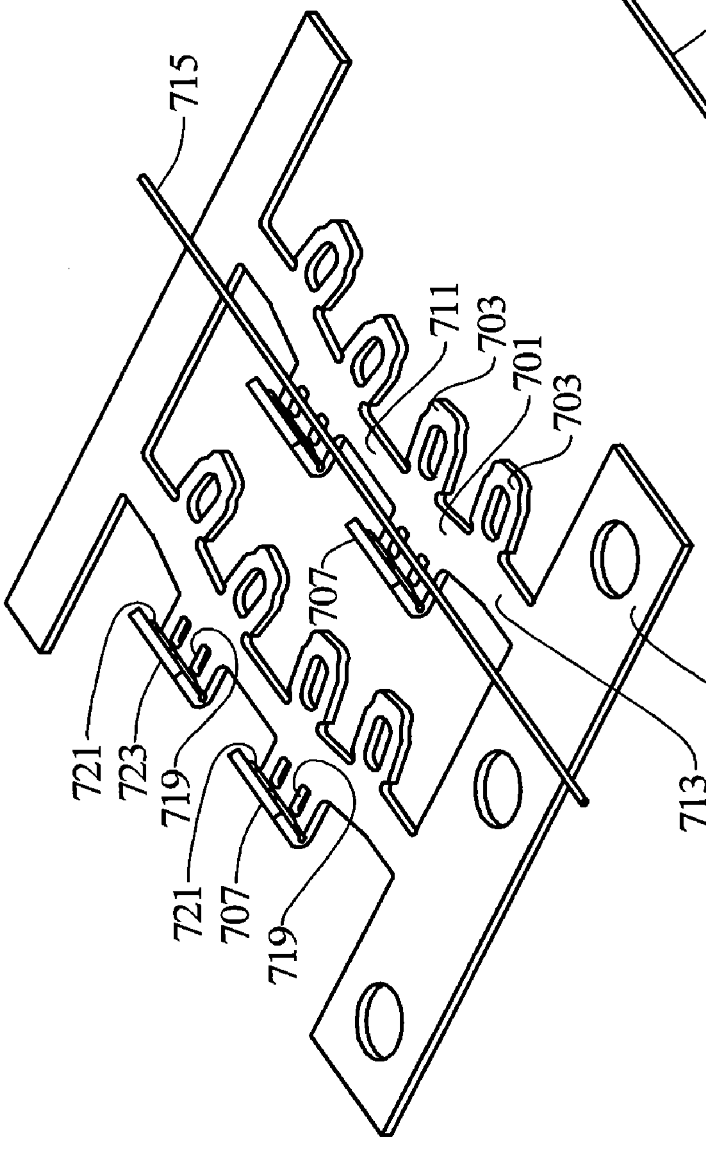
FIG. 25 shows pairs of connected conduction clips according to another embodiment of the invention.
Figure 27:
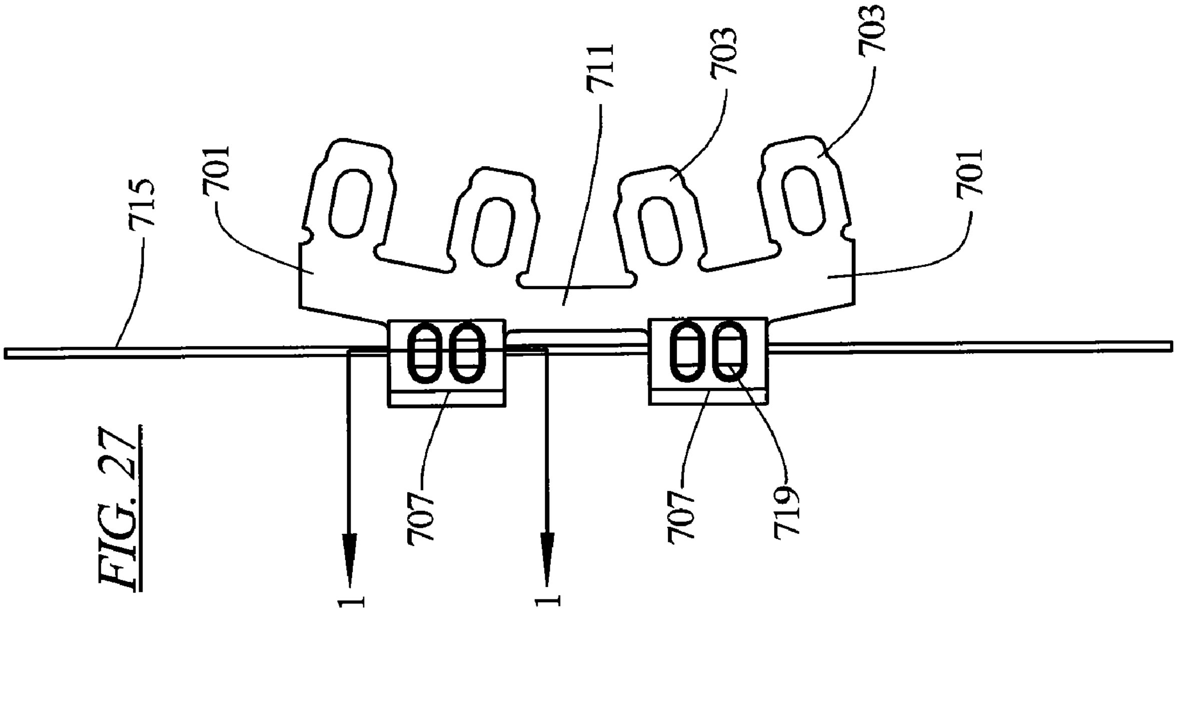
FIG. 27 shows a plan view of the connected conduction clips of FIG. 26.

Another embodiment of the conduction clip that may be coupled to a printed circuit board is depicted in FIGS. 25-27. In this embodiment, a conduction clip 701 includes a pair of conduction posts 703 that may be press-fit into a printed circuit board, not shown. The posts 703 serve to hold the conduction clip 701 to the printed circuit board during the solder operation. The conduction clip 701 also includes a crimping portion 707 that may be crimped to a continuous wire 715, such as a shape memory wire, to electrically couple the conduction clip 701 to the wire. As illustrated by FIG. 26, the conduction clip 701 defines a generally arcuate-shaped configuration.

Referring to FIG. 25, to manufacture the conduction clips 701, the clips can be stamped with carrier strips 709 that are part of a supply reel. The conduction clips 701 are connected by linkage 711 and are joined to the carrier strips 709 through linkages 713. A continuous wire 715, such as a shape memory wire, may be joined to each conduction clip 701 at the crimping portion 707 to form multiple wire terminal assemblies. During the crimping of the crimping portion 707 onto the continuous wire 715, the carrier strips 709 may also be cut away from the connected conduction clips 701 at the linkage 713 resulting in continuous wire terminal assemblies, as depicted in FIG. 26, which may then be wound onto reels for subsequent shipment and use. To form a single wire-terminal assembly, such as the single wire-terminal assembly 717 of FIG. 33, the linkage 711 can be simply cut or removed as well as the portion of the continuous wire 715 located at the linkage 711.

Figure 28:
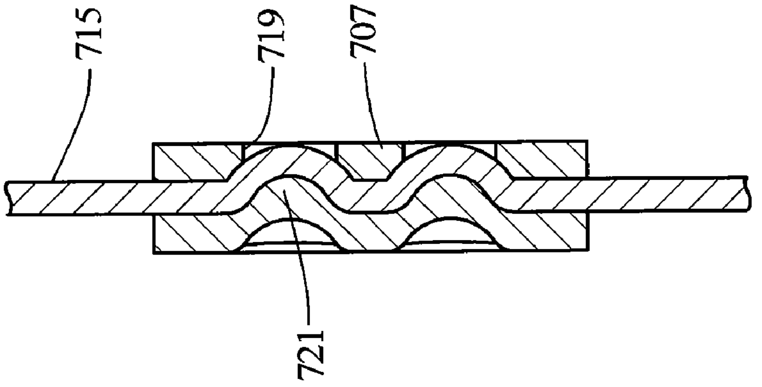
FIG. 28 shows a cross-section view of the crimping portion of the conduction clip of FIG. 27 taken at line 1-1.

Referring to FIGS. 25-28, in one aspect of the embodiment, the crimping portions 707 define cut-outs 719 and raised pads 721 formed on a tab portion 723 of the crimping portion 707. The cut-outs 719 and raised pads 721 are sized and shaped to mate together when the crimping portion 707 is crimped together. When the continuous wire 715 is placed in the crimping portion 707 across the cut-outs 719, as depicted in FIG. 25, and the tab portion 723 is folded flat onto the conduction clip 701, the raised pads 721 will press the continuous wire 715 into the cut-outs 719 and thereby further secure and anchor the continuous wire 715 onto the conduction clip 701. Referring to FIG. 28, a cross-section of the crimping portion 707 is depicted and illustrates the raised pads 721 pressing the continuous wire 715 into the cut-outs 719. With this configuration, the crimping portion 707 will provide increased wire retention on the continuous wire 715.

Figure 30:
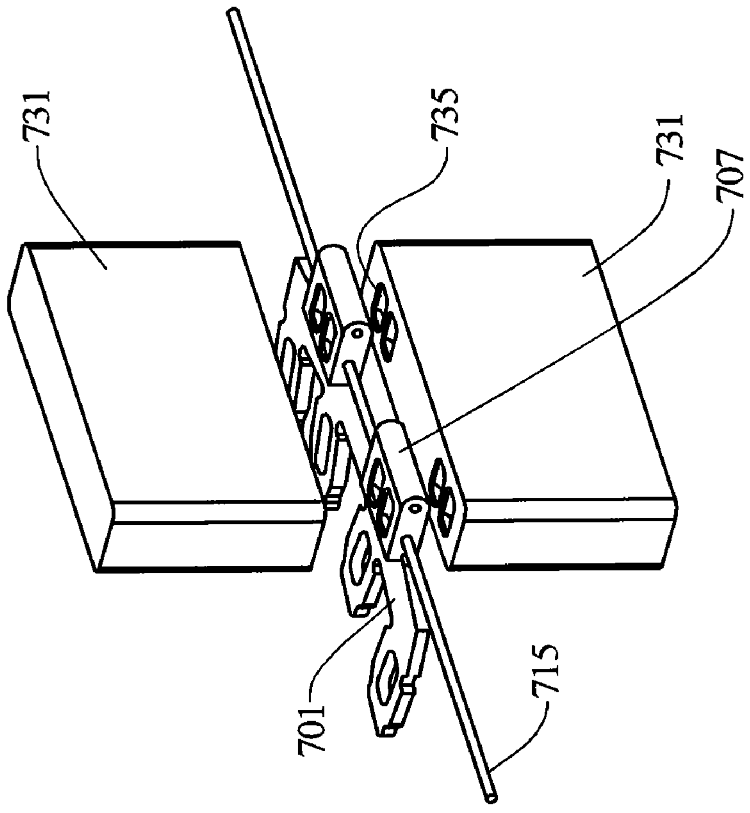
FIG. 30 shows another isometric view of an exemplary crimping applicator.
Figure 29:
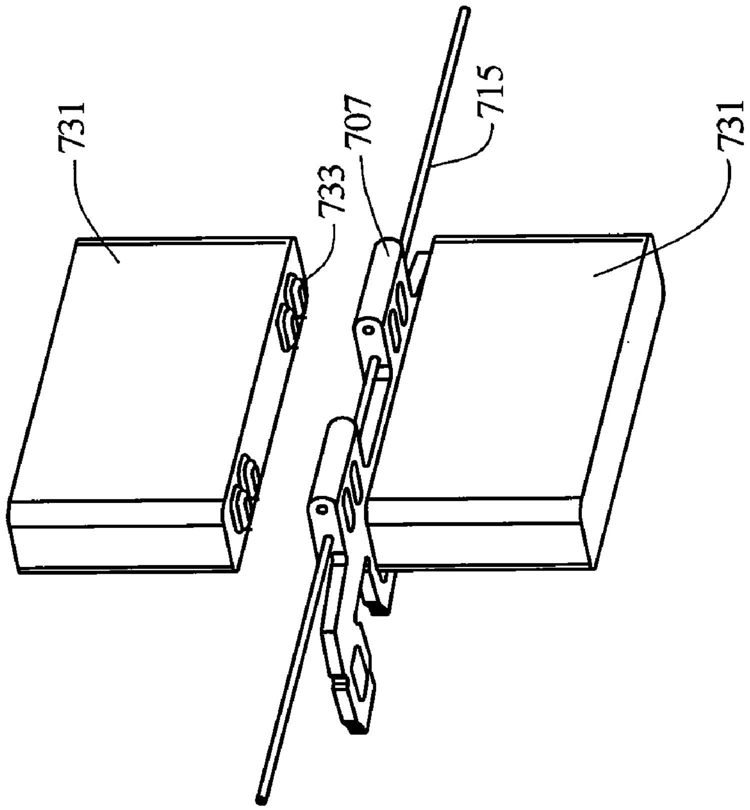
FIG. 29 shows an isometric view of an exemplary crimping applicator.

In another aspect of the invention depicted in FIGS. 29 and 30, the crimping portion 707 may be crimped by a crimping applicator 731. The crimping applicator 731 will crimp or deform the crimping portion 707 onto the continuous wire 715. To accomplish the crimping, raised pads 733 (FIG. 29) are positioned on one surface of the applicator 731, and detents 735 (FIG. 30) are configured on an opposing surface of the applicator 731. It should be understood that the number, shape and configuration of the raised pads 733 and detents 735 may vary depending on the application. By placing the crimping portion 707 between the raised pads 733 and the detents 735 and pressing the raised pads 733 into the detents 735 the crimping portion 707 and accompanying wire 715 will be crimped or deformed at that location. The resulting configuration will have a cross-section similar to the cross-section depicted in FIG. 28. With this technique, the crimping portion 707 will provide increased wire retention on the continuous wire 715.

Figure 31:
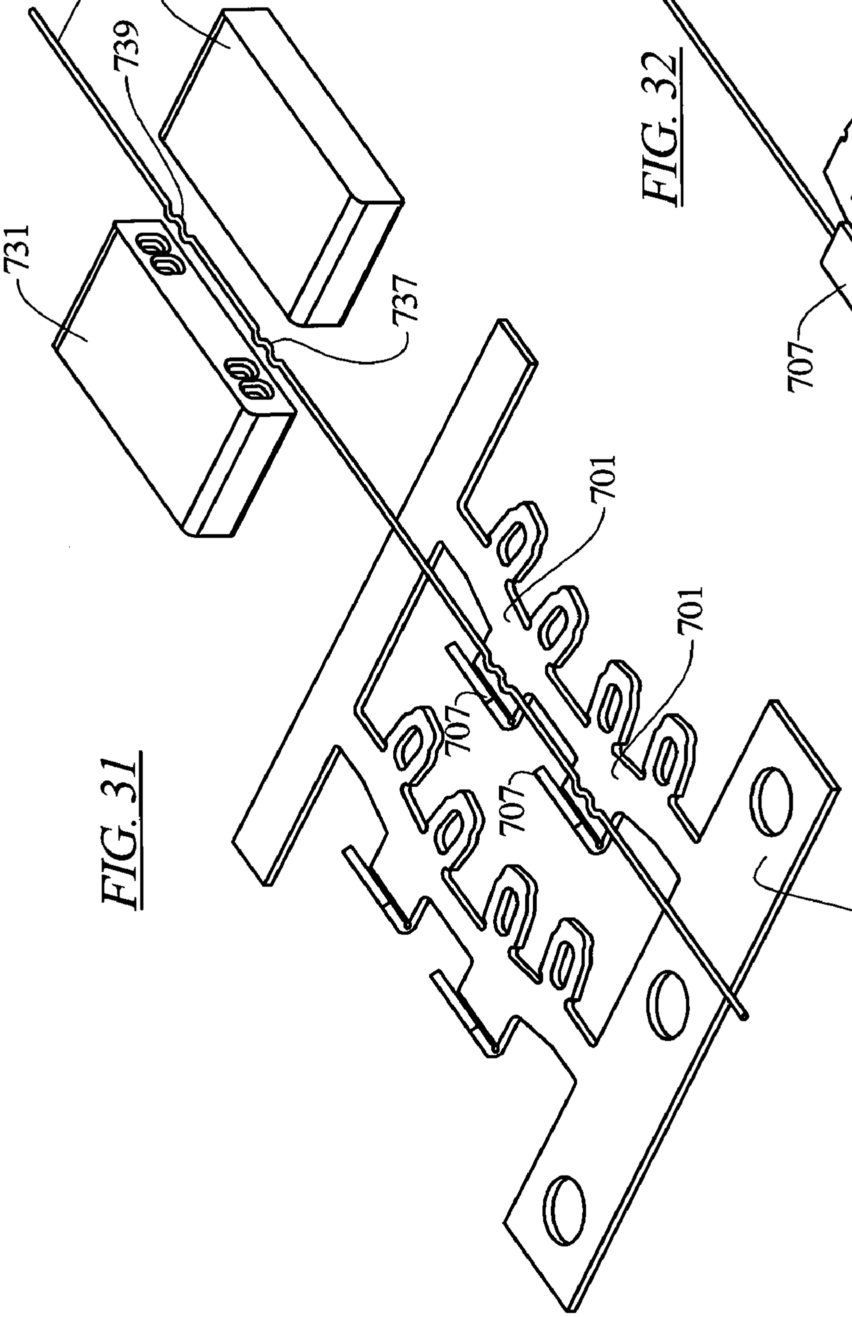
FIG. 31 shows an alternative use of the crimping applicator of FIG. 29.
Figure 32:
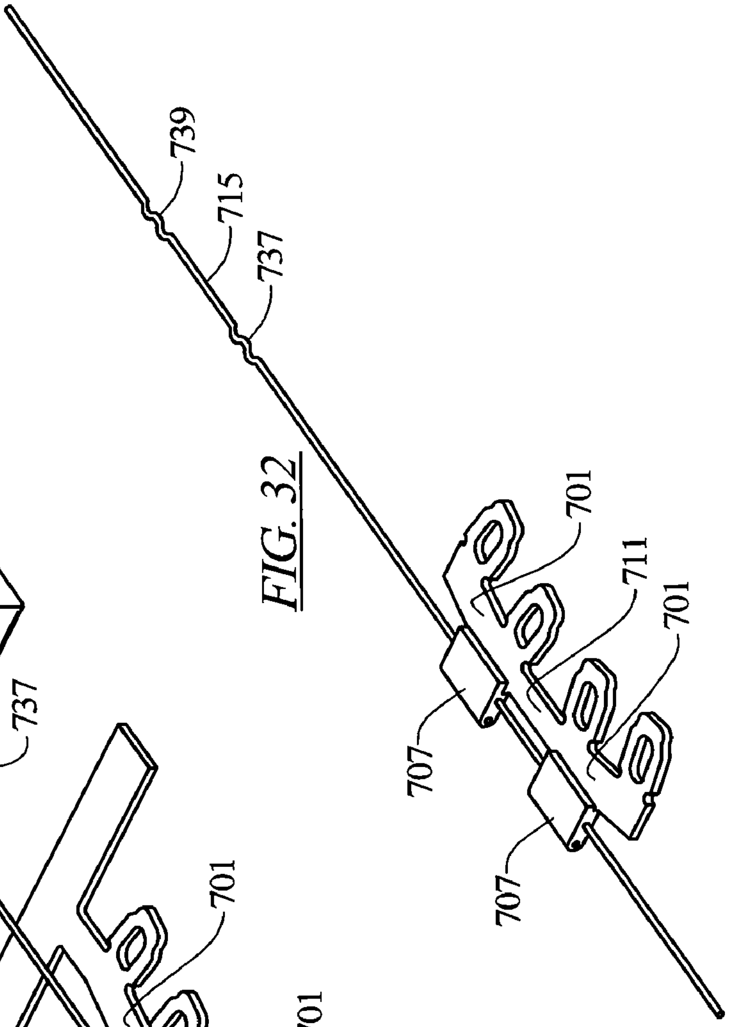
FIG. 32 shows a continuous wire crimped with the crimping applicator of FIG. 31.

In yet another aspect of the invention depicted in FIGS. 31 and 32, the continuous wire 715 may be crimped by the crimping applicator 731. The crimping applicator 731 will crimp or deform the wire 715 prior to it being placed in the crimping portion 707. As shown in FIG. 31, the wire 715 is crimped at sections 737 and 739 by placing the wire 715 between the raised pads 733 and the detents 735 of the applicator 731 and pressing the raised pads 733 into the detents 735 thereby crimping the wire at that location. The wire 715 is then indexed to the crimping portion 707 where the tab of the crimping portion 707 is folded onto the crimped portion of the wire 715, as shown in FIG. 32. In this embodiment, the crimping portion 707 will not include the cut-outs and raised pads.

Figure 33:
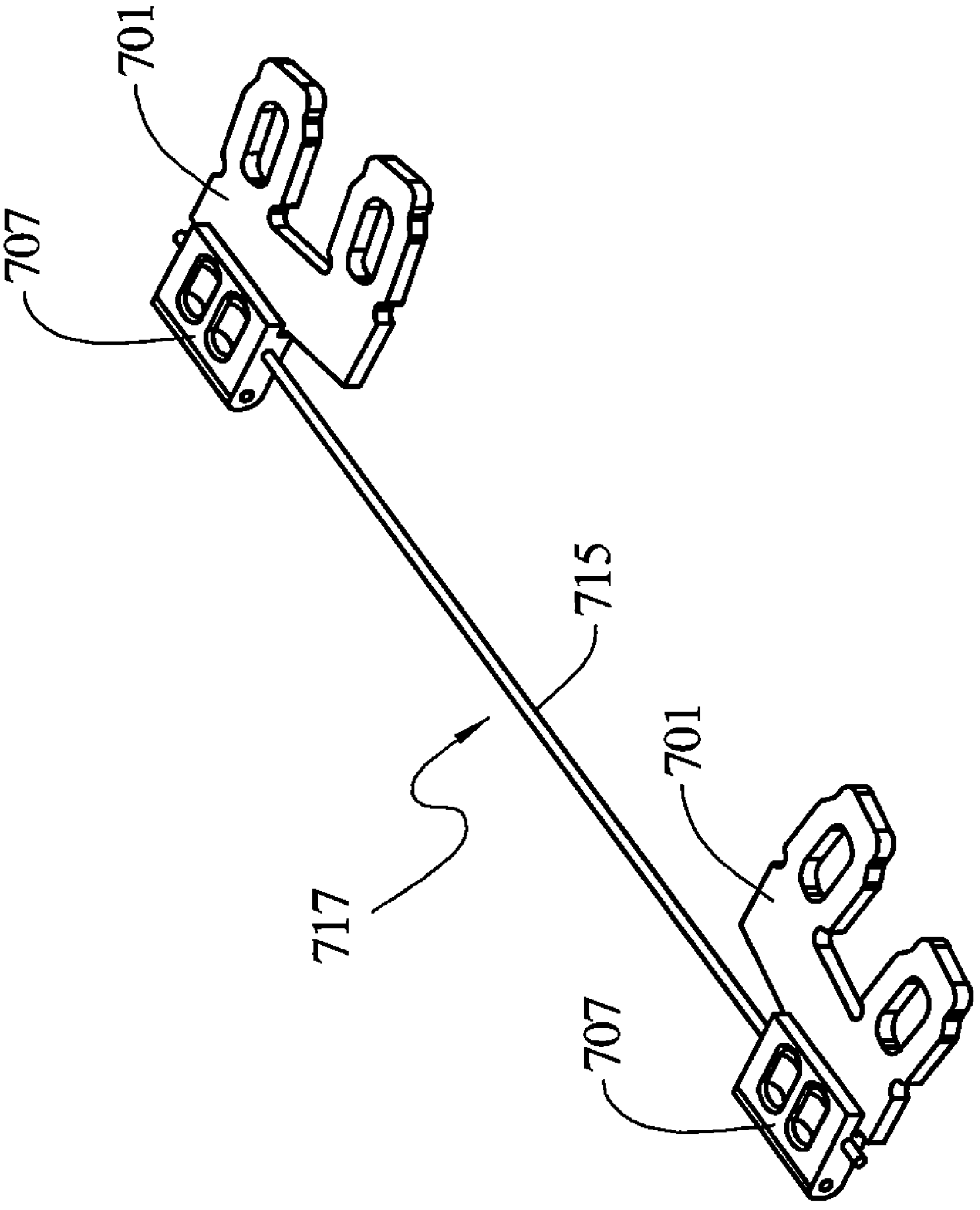
FIG. 33 shows a wire terminal assembly according to an alternative exemplary embodiment of the invention.

Referring to FIG. 33, to form a single wire terminal assembly, such as the wire terminal assembly 717, the linkage 711 shown in FIG. 25 is cut or removed as well as the wire 715 segment at that location, resulting in the single wire terminal assembly.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It is also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A method for manufacturing a wire terminal assembly comprising the steps of:

providing a plurality of conduction pads on at least one carrier strip, wherein adjacent conduction pads are connected by a connecting linkage, each of the conduction pads including a crimping portion;

inserting a continuous wire through the crimping portion of the plurality of conduction pads;

crimping the crimping portion of the plurality of conduction pads to secure the continuous wire to the crimping portion of each conduction pad to provide electrical conductivity between the continuous wire and each said conduction pad;

removing the at least one carrier strip; and winding the plurality of conduction pads and the continuous wire onto a reel.

2. The method of claim 1, further comprising the step of:

unwinding the reel to expose a first pair of adjacent conduction pads and a second pair of adjacent conduction pads.

3. The method of claim 2, further comprising the step of removing the connecting linkage between the first pair of adjacent conduction pads and between the second pair of adjacent conduction pads to form a single wire terminal assembly.

4. The method of claim 1, wherein the continuous wire is shape memory wire.

5. A method for manufacturing a wire terminal assembly comprising the steps of:

providing a plurality of conduction pads on at least one carrier strip, wherein adjacent conduction pads are connected by a connecting linkage, each of the conduction pads including a crimping portion;

inserting a continuous wire through the crimping portion of the plurality of conduction pads;

securing the continuous wire to the crimping portion of each conduction pad to provide electrical conductivity between the continuous wire and each said conduction pad;

removing the at least one carrier strip; and winding the plurality of conduction pads and the continuous wire onto a reel, wherein the plurality of conduction pads are self-locking conduction pads.

6. The method of claim 5, wherein each of the self-locking conduction pads define an opening extending through the conduction pad and have a first spring leg defining a first contact surface and a second spring leg defining a second contact surface, the first and second contact surfaces being positioned in opposing relationship around the opening.

* * * * *